(12) United States Patent
Okazono et al.

(10) Patent No.: US 8,881,765 B2
(45) Date of Patent: Nov. 11, 2014

(54) FUEL FEED APPARATUS

(75) Inventors: Tetsuro Okazono, Okazaki (JP); Shinobu Oikawa, Kariya (JP); Hironobu Oki, Oyama (JP)

(73) Assignees: Denso Corporation, Kariya (JP); Kyosan Denki Co., Ltd., Koga (JP)

( * ) Notice: Subject to any disclaimer, the term of this patent is extended or adjusted under 35 U.S.C. 154(b) by 541 days.

(21) Appl. No.: 13/229,995

(22) Filed: Sep. 12, 2011

(65) Prior Publication Data

US 2012/0060950 A1     Mar. 15, 2012

(30) Foreign Application Priority Data

Sep. 13, 2010  (JP) .................................. 2010-204625
May 25, 2011  (JP) .................................. 2011-117194

(51) Int. Cl.
| | |
|---|---|
| *F02M 37/10* | (2006.01) |
| *F02M 37/00* | (2006.01) |
| *G01F 23/36* | (2006.01) |
| *B60K 15/03* | (2006.01) |

(52) U.S. Cl.
CPC ............... *F02M 37/00* (2013.01); *F02M 37/10* (2013.01); *G01F 23/36* (2013.01); *B60K 15/03* (2013.01); *B60K 2015/03217* (2013.01); *B60K 2015/03453* (2013.01); *B60K 2015/03243* (2013.01)
USPC ............ 137/565.37; 137/565.24; 137/565.34; 123/509; 417/360; 417/363

(58) Field of Classification Search
CPC ........................... F02M 37/106; F02M 37/103
USPC ............ 137/565.17, 565.24, 565.34, 565.37, 137/558; 417/360, 363; 123/509
See application file for complete search history.

(56) References Cited

U.S. PATENT DOCUMENTS 6,260,543 B1      7/2001  Chih
6,328,063 B1 *  12/2001  Tistchenko .............. 137/565.22
(Continued)

FOREIGN PATENT DOCUMENTS

EP     0 903 255    3/1999
GB     2 440 521    2/2008
(Continued)

OTHER PUBLICATIONS

U.S. Appl. No. 13/230,076, of Okazono, filed Sep. 12, 2011.
(Continued)

*Primary Examiner* — Atif Chaudry
(74) *Attorney, Agent, or Firm* — Nixon & Vanderhye PC

(57) ABSTRACT

A reservoir is located in a fuel tank. The reservoir is in a bottomed tubular shape having a periphery defining an opening. A lid member is located in the fuel tank and mounted to the periphery of the reservoir to close the opening. A pump unit is partially accommodated in the reservoir to discharge fuel stored in the reservoir to an exterior of the fuel tank. The pump unit is located at a position offset from a center axis of the lid member. The pump unit has a projection projected from the lid member to an exterior of the reservoir. A remaining quantity detector is configured to detect a quantity of fuel in the fuel tank. The remaining quantity detector is located at a remaining space remaining in the fuel tank. The remaining space is located on the lid member and located around the projection.

6 Claims, 19 Drawing Sheets

(56) References Cited

U.S. PATENT DOCUMENTS

| | | | |
|---|---|---|---|
| 7,527,042 B2 * | 5/2009 | Crary | 123/509 |
| 2005/0166974 A1 * | 8/2005 | Hashiguchi | 137/571 |
| 2007/0209641 A1 | 9/2007 | Danjyo | |

FOREIGN PATENT DOCUMENTS

| | | |
|---|---|---|
| JP | 3-124954 | 5/1991 |
| JP | 4059428 | 12/2007 |
| JP | 2008-248801 | 10/2008 |

OTHER PUBLICATIONS

U.S. Appl. No. 13/230,049, of Okazono, filed Sep. 12, 2011.
U.S. Appl. No. 13/230,027, of Okazono, filed Sep. 12, 2011.
Office Action (2 pages) dated May 7, 2014 issued in corresponding Japanese Application No. 2011-117194 and English translation (4 pages).

* cited by examiner

FUEL FEED APPARATUS

CROSS REFERENCE TO RELATED APPLICATIONS

This application is based on and claims priority to Japanese Patent Applications No. 2010-204625 filed on Sep. 13, 2010 and No. 2011-117194 filed on May 25, 2011, the contents of which are incorporated in their entirely herein by reference.

FIELD OF THE INVENTION

The present invention relates to a fuel feed apparatus equipped in a fuel tank of a vehicle for feeding fuel to an exterior of the fuel tank.

BACKGROUND OF THE INVENTION

For example, a known fuel feed apparatus includes a bottomed tubular reservoir located in a fuel tank for storing fuel and a pump unit for discharging stored fuel to an exterior of the fuel tank.

JP-A-2008-248801 discloses one example of such a reservoir-type fuel feed apparatus including an annular bracket located in a fuel tank. The annular bracket is mounted to an opening periphery of the reservoir for supporting a pump unit. The fuel feed apparatus disclosed in JP-A-2008-248801 includes a remaining quantity detector located in a fuel tank and provided to the outside of the reservoir. The remaining quantity detector detects remaining fuel in the fuel tank.

When a vehicle equipped with the fuel feed apparatus disclosed in JP-A-2008-248801 is inclined quickly relative to the horizontal surface, fuel may spill from the opening of the reservoir. Consequently, the reservoir may not be able to secure fuel sufficiently for supplying to the exterior of the fuel tank. It is conceivable to increase the height of the reservoir in order to reduce such spill of fuel from the reservoir. However, when the height of the reservoir is increased, it is hard to secure a space for accommodating the remaining quantity detector on the reservoir, in consideration of the limited volume of the fuel tank. In the fuel feed apparatus of JP-A-2008-248801, the lateral side of the reservoir is dented inward to secure a space for receiving the remaining quantity detector. However, the structure of JP-A-2008-248801 is undesirable, since the reservoir is reduced in volume by the dented space, and consequently, the amount of fuel storage is also reduced.

SUMMARY OF THE INVENTION

In view of the foregoing and other problems, it is an object of the present invention to produce a fuel feed apparatus including a reservoir located in the fuel tank, the reservoir having an enlarged fuel storage.

According to one aspect of the present invention, a fuel feed apparatus for feeding fuel from a fuel tank, the fuel feed apparatus comprises a reservoir located in the fuel tank, the reservoir being in a bottomed tubular shape having a periphery defining an opening. The fuel feed apparatus further comprises a lid member located in the fuel tank and mounted to the periphery of the reservoir to close the opening. The fuel feed apparatus further comprises a pump unit partially accommodated in the reservoir and configured to discharge fuel stored in the reservoir to an exterior of the fuel tank, the pump unit being located at a position offset from a center axis of the lid member, the pump unit having a projection projected from the lid member to an exterior of the reservoir. The fuel feed apparatus further comprises a remaining quantity detector configured to detect a quantity of fuel in the fuel tank, the remaining quantity detector being located at a remaining space remaining in the fuel tank, the remaining space being located on the lid member and located around the projection.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

As follows, multiple embodiments of the present invention will be described with reference to drawings.

First Embodiment

Figure 1:
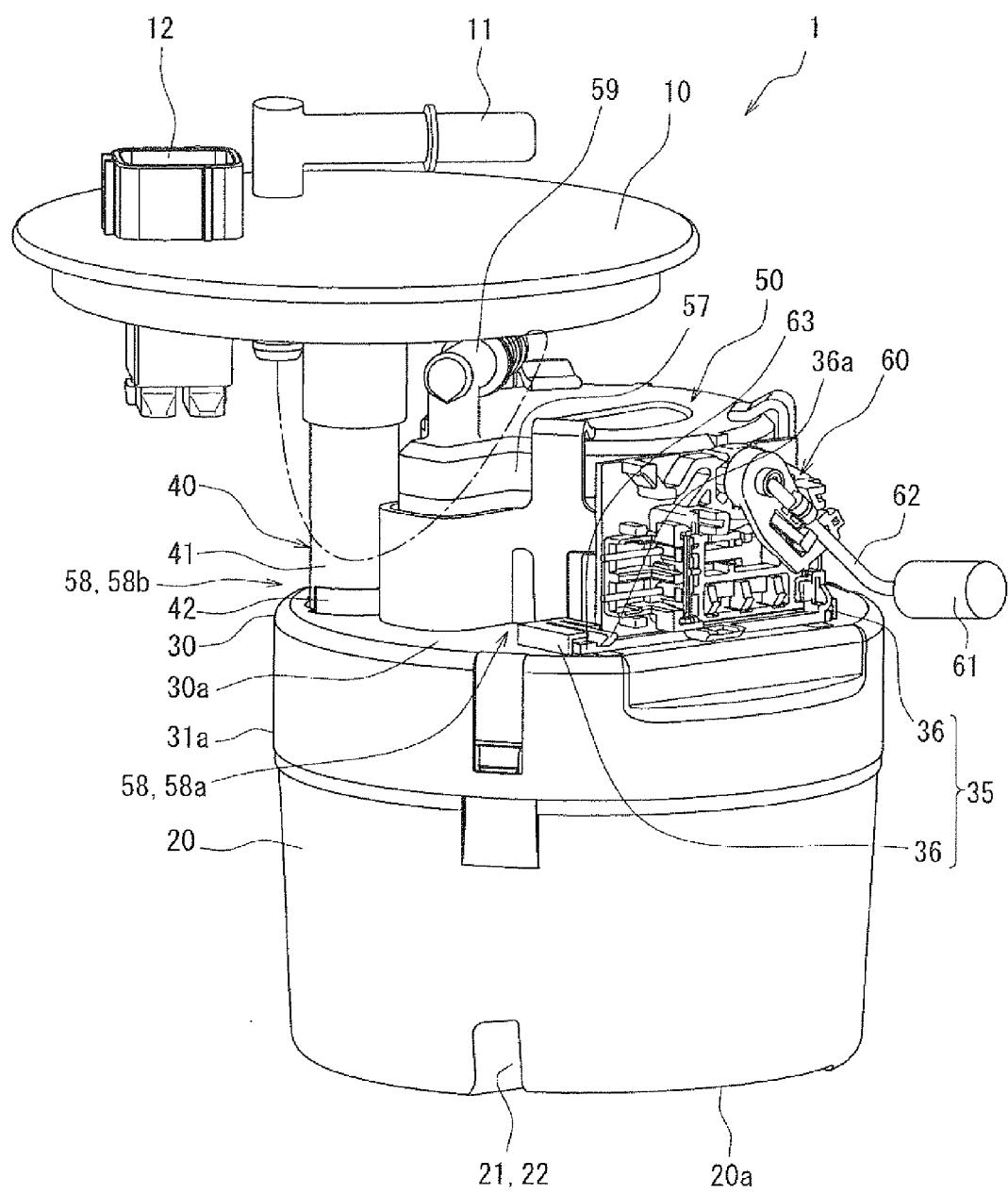
FIG. 1 is a perspective view showing a fuel feed apparatus according to the first embodiment.
Figure 2:
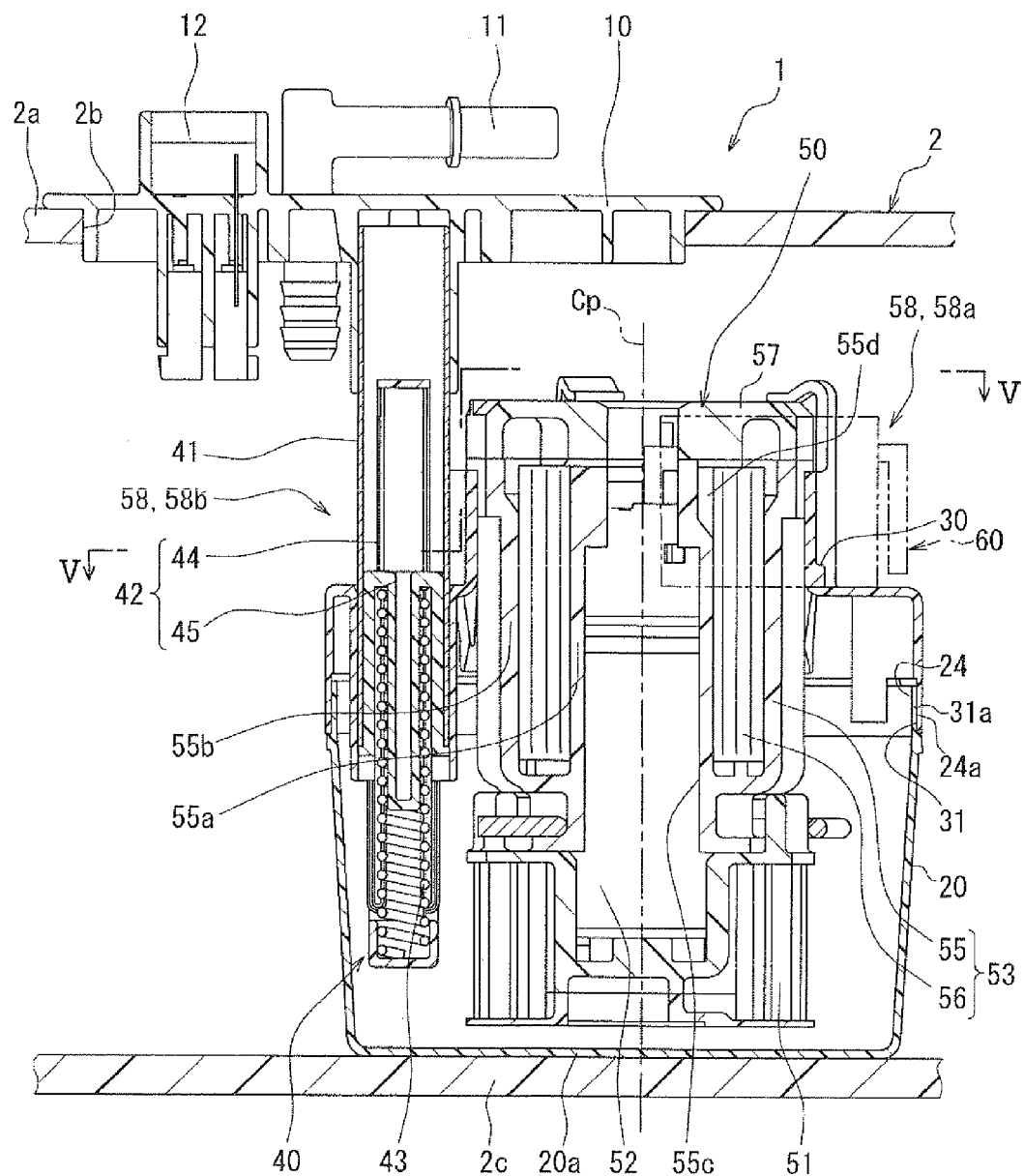
FIG. 2 is a sectional view taken along the line II-II in FIG. 3.

FIGS. 1, 2 show a fuel feed apparatus according to the first embodiment. A fuel feed apparatus 1 is equipped in a fuel tank 2 of a vehicle for feeding fuel to an exterior of the fuel tank 2.

General Configuration

The fuel feed apparatus 1 includes a flange 10, a reservoir 20, a lid member 30, an adjustment device 40, a pump unit 50, and a remaining quantity detector 60. As shown in FIG. 2, components 20, 30, 40, 50, and 60 of the fuel feed apparatus 1 other than the flange 10 are located at predetermined positions inside the fuel tank 2. The vertical direction in FIG. 2 substantially coincides with the vertical direction of the vehicle being on a horizontal surface.

Figure 3:
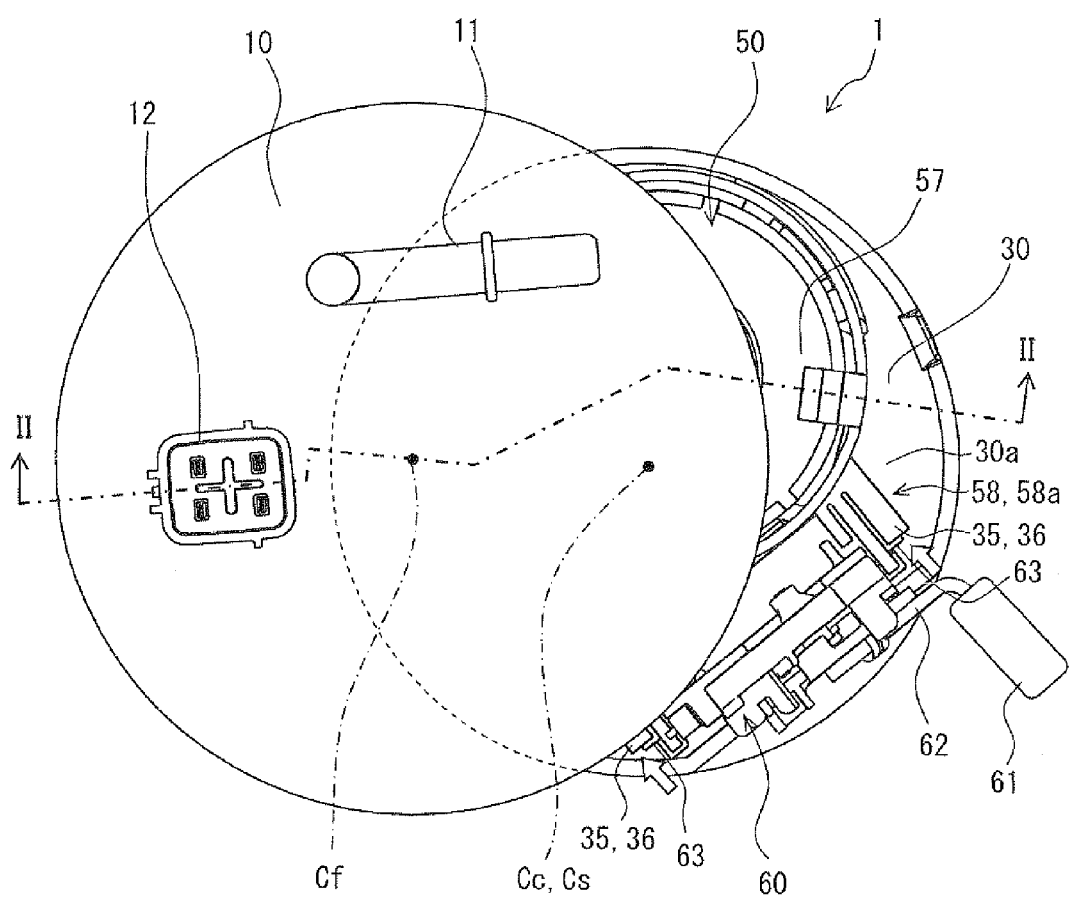
FIG. 3 is a top view showing the fuel feed apparatus.

As shown in FIGS. 1 to 3, the flange 10 in a disc shape is formed of resin. The flange 10 is fitted in a through hole 2b to close the through hole 2b. The through hole 2b extends through a top plate portion 2a of the fuel tank 2. A fueling pipe 11 and an electrical connector 12 are provided to the flange 10. The fueling pipe 11 is used for supplying fuel discharged from the pump unit 50 to the exterior of the fuel tank 2. The electrical connector 12 is electrically connected with the pump unit 50 and the remaining quantity detector 60. In the present configuration, a fuel pump 52 of the pump unit 50 is supplied with an electric power through the electrical connector 12, thereby being driven and controlled. In addition, the remaining quantity detector 60 outputs a remaining quantity detection signal through the electrical connector 12.

Figure 4:
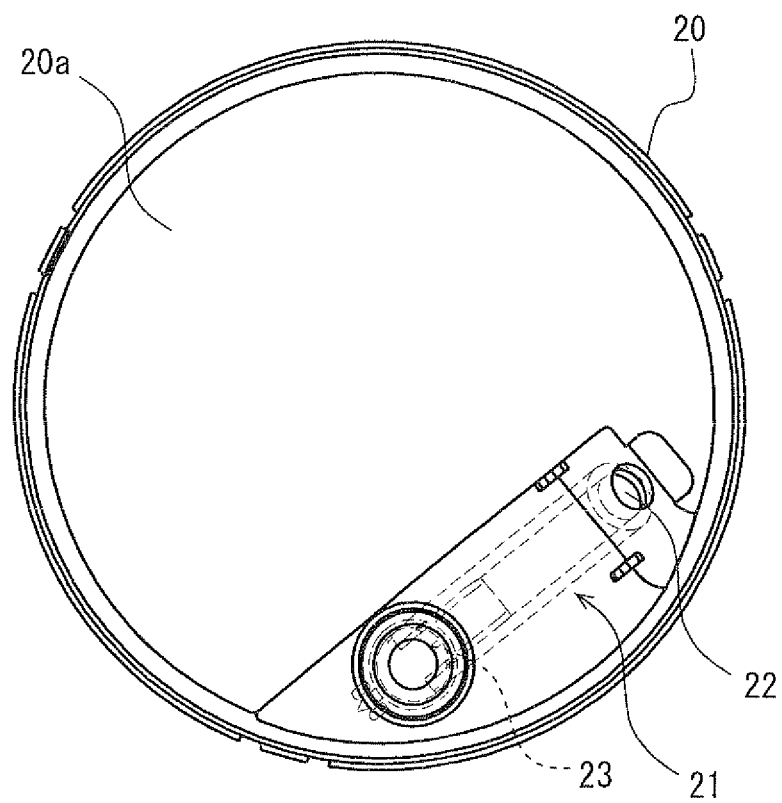
FIG. 4 is a top view showing a reservoir of the fuel feed apparatus.
Figure 5:
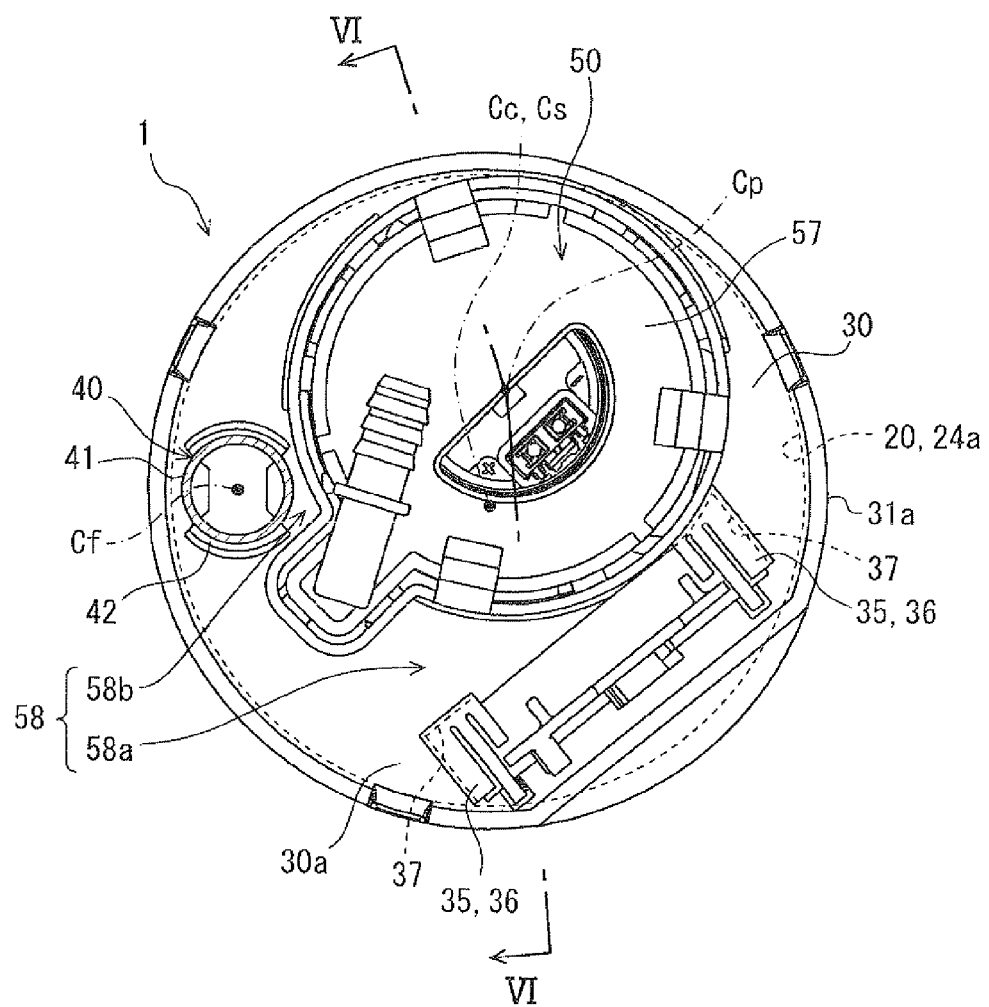
FIG. 5 is a sectional view taken along the line V-V in FIG. 2 and showing a substantial part of the fuel feed apparatus.
Figure 6:
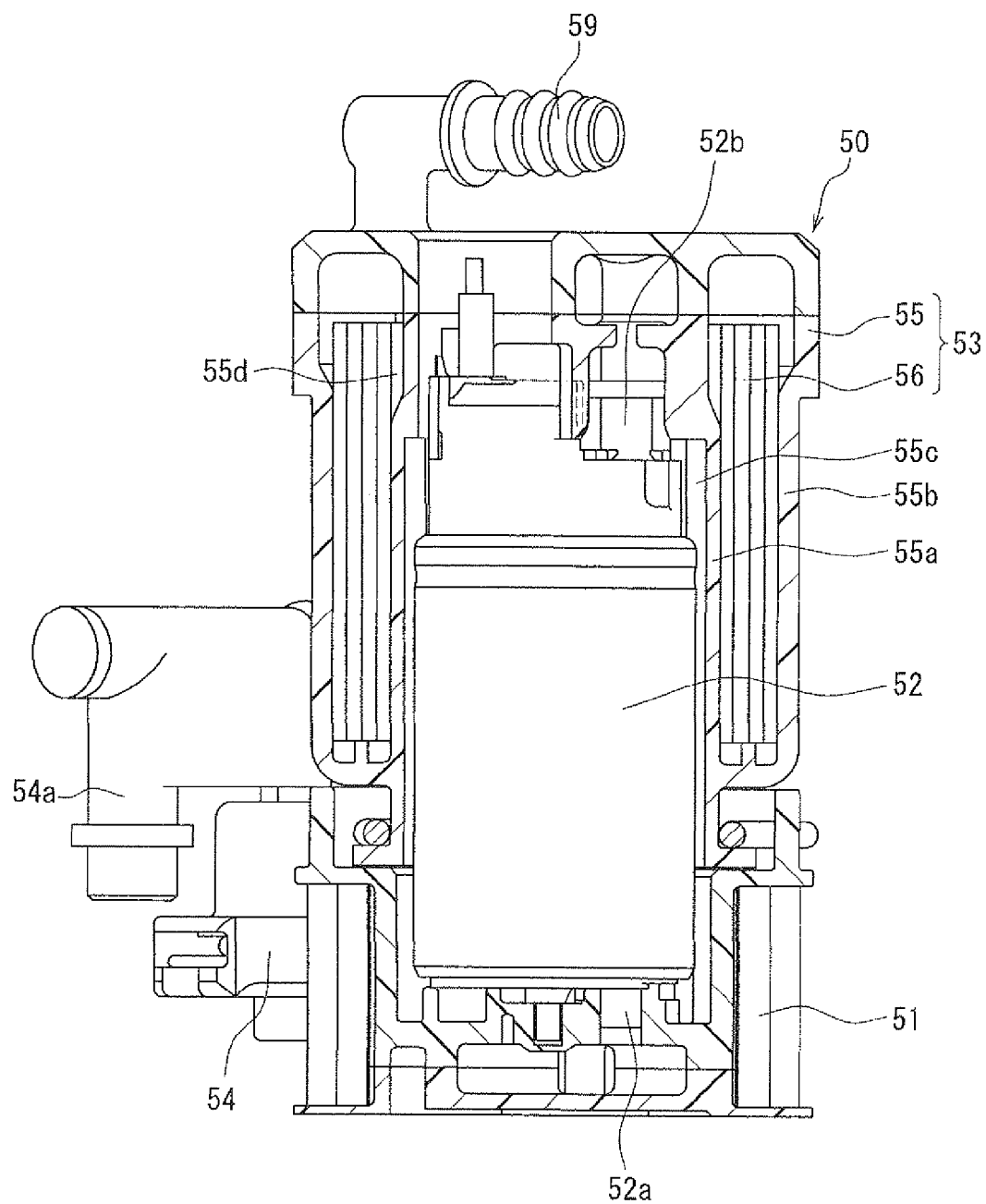
FIG. 6 is a sectional view taken along the line VI-VI in FIG. 5.

As shown in FIGS. 1, 2, the reservoir 20 being in a bottomed tubular shape is formed of resin. The reservoir 20 is accommodated in the fuel tank 2 and located on a bottom portion 2c of the fuel tank 2. As shown in FIGS. 3, 5, the reservoir 20 has a center axis Cs being offset from a center axis Cf of the flange 10. As shown in FIGS. 1, 4, a jet pump 21 is provided to a bottom portion 20a of the reservoir 20. The jet pump 21 has an introduction passage 22 and a jet nozzle 23. The introduction passage 22 communicates the interior of the fuel tank 2 with the interior of the reservoir 20. As shown in FIG. 6, a pressure regulator 54 of the pump unit 50 exhausts surplus fuel. The jet nozzle 23 jets the exhausted surplus furl into the introduction passage 22. The fuel jet causes a negative pressure in the introduction passage 22. The negative pressure, which is lower than atmospheric pressure, causes the introduction passage 22 to draw fuel from the fuel tank 2 into the reservoir 20. The reservoir 20 stores the fuel drawn in this way.

As shown in FIGS. 1, 2, 5, the lid member 30 formed of resin is in a tubular shape having a ceiling. The lid member 30 has a circumferential periphery 31a defining a lower opening 31. The circumferential periphery 31a of the lid member 30 is fitted to a circumferential periphery 24a of an upper opening 24 of the reservoir 20. The lid member 30 is coaxial with the reservoir 20. As show in FIGS. 3, 5, a center axis Cc of the lid member 30 is offset from (i.e., located at a different position from) the center axis Cf of the flange 10. The lid member 30 blocks the opening 24 of the reservoir 20 accommodated in the fuel tank 2. The lid member 30 holds the pump unit 50 and the remaining quantity detector 60 in the fuel tank 2.

The adjustment device 40 includes a supporf shaft 41, an intermediate member 42, and an elastic member 43. The support shaft 41 formed of metal is in a tubular shape. The support shaft 41 is press-fitted to the flange 10 to be coaxial with the flange 10. The support shaft 41 is integrated with components (integrated components) 20, 30, 50, 60 via the intermediate member 42. In this way, the flange 10 is connected with the integrated components 20, 30, 50, 60 via the support shaft 41 being a single component.

As shown in FIG. 2, the intermediate member 42 includes a pair of brackets 44, 45 formed of resin. The brackets 44, 45 are not rotative relative to each other in the circumferential direction of the support shaft 41. The brackets 44, 45 are movable relative to each other in the axial direction of the support shaft 41. The brackets 44, 45 are mounted to the lid member 30 and the support shaft 41. Thereby, the intermediate member 42 constructed of the brackets 44, 45 regulates relative movement between the support shaft 41 and the integrated components 20, 30, 50, 60 in the circumferential direction of the support shaft 41 while allowing relative movement between the support shaft 41 and the integrated components 20, 30, 50, 60 in the axial direction of the support shaft 41.

In the present example, the elastic member 43 is a coil spring. The elastic member 43 is interposed between the bracket 45 of the intermediate member 42 and the lid member 30. The bracket 45 is integrated with the support shaft 41. The elastic member 43 applies an elastic force in the axial direction of the support shaft 41 to bias the integrated components 20, 30, 50, 60 toward the bottom portion 2c of the fuel tank 2. Thereby, the elastic member 43 regularly biases the bottom portion 20a of the reservoir 20 onto the bottom portion 2c of the fuel tank 2. In the present embodiment, the elastic member 43 and the intermediate member 42 function to stabilize the positions of the integrated components 20, 30, 50, 60 in the fuel tank 2.

The pump unit 50 has a lower portion accommodated in the reservoir 20 and an upper portion projecting from the lid member 30. As shown in FIGS. 2, 6, the pump unit 50 includes a suction filter 51, the fuel pump 52, a fuel filter 53, and the pressure regulator 54.

The suction filter 51 is located at the lowermost portion of the pump unit 50. The suction filter 51 is connected with a fuel inlet port 52a of the fuel pump 52 for removing large foreign matter contained in fuel drawn by the fuel pump 52 from the reservoir 20. The fuel pump 52 is located on the upper side of the suction filter 51 in the pump unit 50. The fuel inlet port 52a extends downward from the fuel pump 52. A fuel outlet port 52b extends upward from the fuel pump 52. The fuel pump 52 draws fuel from the reservoir 20 into the fuel inlet port 52a through the suction filter 51. The fuel pump 52 draws fuel by a quantity corresponding to rotation of a built-in motor (not shown) of the fuel pump 52. The fuel pump 52 pressurizes the drawn fuel and discharges the pressurized fuel through the fuel outlet port 52b.

The fuel filter 53 is located in the pump unit 50. The fuel filter 53 surrounds the upper portion and the circumferential periphery of the fuel pump 52. A filter case 55 of the fuel filter 53 includes tubular portions 55a, 55b formed of resin. The tubular portions 55a, 55b have a two-layer structure including an inner tubular portion 55a defining an inner space 55c in which the fuel pump 52 is located. The fuel pump 52 is coaxial with the tubular portion 55a. A filter element 56 of the fuel filter 53 is, for example, a honeycomb-like filter sheet. The filter element 56 is accommodated in a space 55d between the inner tubular portion 55a and an outer tubular portion 55b. The space 55d defined between the tubular portions 55a, 55b has a fuel upstream side and a fuel downstream side on both sides of the filter element 56. The fuel upstream side and the fuel downstream side respectively communicate with the fuel outlet port 52b of the fuel pump 52 and a fuel outlet 59 of the fuel filter 53. In the present structure, fuel flows from the fuel outlet port 52b into the space 55d, and microscopic foreign matter contained in the flowing fuel is removed through the filter element 56. The fuel is, as shown by the dashed dotted line in FIG. 1, discharged to the fueling pipe 11 connected with the fuel outlet 59.

As shown in FIG. 6, the pressure regulator 54 is adjacent to the side of the fuel filter 53 in the pump unit 50. Fuel is supplied to the fueling pipe 11, and the fuel partially flows into the pressure regulator 54 connected with the fuel outlet 59 of the fuel filter 53. In the present structure, the pressure regulator 54 controls a pressure of the fuel discharged to the fueling pipe 11, which is outside of the fuel tank 2. The pressure regulator 54 generates surplus fuel when regulating the pressure of fuel and discharges the surplus fuel to the jet nozzle 23 (FIG. 4) of the jet pump 21 through an exhaust pipe 54a.

As shown in FIGS. 1, 3, the remaining quantity detector 60 is supported on the lid member 30 and located outside of the reservoir 20. In the present example, the remaining quantity detector 60 is a sender gauge including an arm 62 holding a float 61. The float 61 floats in fuel stored in the fuel tank 2. The remaining quantity detector 60 detects a quantity of fuel remaining in the fuel tank 2 according to the rotation angle of the arm 62.

Configuration

As follows, a configuration of the fuel feed apparatus 1 will be described. As shown in FIGS. 2, 5, the pump unit 50 has a projection 57. The projection 57 is located at a position of the center axis Cp of the pump unit 50. The center axis Cp of the pump unit 50 is offset from the center axis Cc of the lid member 30. The center axis Cc of the lid member 30 coincides with the center axis Cs of the reservoir 20. The projection 57 is extended from the filter case 55 and is projected relative to the lid member 30. The projection 57 may be accommodated in the reservoir 20. As shown in FIGS. 1 to 3, 5, a space 58 is formed on the lid member 30 and under the top plate portion 2a and the flange 10 in the fuel tank 2. The space 58 is substantially in a crescent shape when being viewed from the upper side. The space 58 surrounds the periphery of the projection 57. In the fuel feed apparatus 1, the remaining quantity detector 60 and the support shaft 41 are located in the remaining space 58. More specifically, the remaining space 58 includes two remaining spaces 58a, 58b located on both sides of the projection 57 in the radial direction or the circumferential direction. One remaining space (first remaining space portion) 58a is located on the opposite side of the center axis Cp in the offset direction in which the center axis Cp is offset. The remaining quantity detector 60 is located in the remaining space 58a. The other remaining space (second remaining space portion) 58b is located on the side of the center axis Cp in the offset direction. The support shaft 41 is located in the remaining space 58b.

Figure 7:
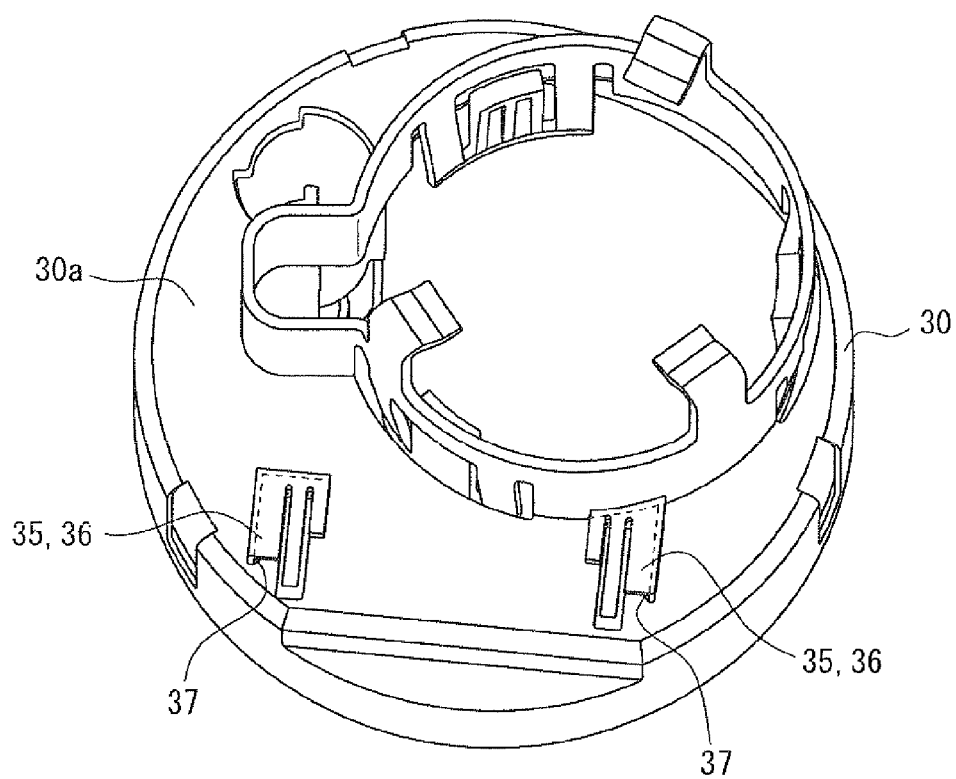
FIG. 7 is a perspective view showing a lid member of the fuel feed apparatus.

As shown in FIGS. 1, 3, in the present example, the remaining quantity detector 60 is mounted on a mount portion 35 of the lid member 30 and thereby supported by the lid member 30. The lid member 30 is formed of resin. The mount portion 35 includes a pair of projected portions 36 provided on an upper surface 30a of the lid member 30. More specifically, as shown in FIGS. 5, 7, the projected portions 36 of the mount portion 35 are projected from two locations in the upper surface 30a of the lid member 30 toward the exterior of the reservoir 20. The two locations, at which the projected portions 36 are located, are spaced from each other in the circumferential direction Each of the projected portions 36 and the upper surface 30a define a slit 37 therebetween. The slit 37 extends substantially in parallel with the diameter and extends along the upper surface 30a of the lid member 30. Referring to FIG. 3, the remaining quantity detector 60 includes a pair of fitting portions 63 each being in a plate shape. Each of the fitting portions 63 is slid into the slit 37 of each of the projected portions 36 in the direction shown by the outlined arrow and fitted to the lid member 30. Thus, the remaining quantity detector 60 is mounted to the lid member 30. In the present example, as shown in FIG. 1, each of the projected portions 36 has a hooking nail 36a configured to hook on the corresponding fitting portion 63 in order to restrict each fitting portion 63 from being detached from the slit 37 of the projected portion 36.

In the fuel feed apparatus 1, the remaining space 58 formed around the projection 57 includes the remaining space 58a located on the opposite side of the support shaft 41 across the projection 57. The remaining quantity detector 60 is positioned in the remaining space 58a. The jet pump 21 is located at a position under the remaining quantity detector 60 in the reservoir 20. The fuel tank 2 has a rear portion capable of securing fuel stored irrespective of inclination of the vehicle relative to the horizontal plane. In the present example, the rear portion of the fuel tank 2 accommodates the jet pump 21 and the remaining quantity detector 60. The remaining quantity detector 60 and the jet pump 21 are arranged above and below in the vertical direction of the reservoir 20.

In the fuel feed apparatus 1 described above, the lid member 30 is attached to the circumferential periphery 24a of the opening 24 of the reservoir 20 located in the fuel tank 2 thereby to close the opening 24. In this way, the lid member 30 prohibits spill of fuel from the reservoir 20 even when the vehicle inclines rapidly relative to the horizontal level. The reservoir 20 accommodates the pump unit 50. It is noted that the projection (part) 57 of the pump unit 50 is projected from the reservoir 20 through the lid member 30 to the outside of the reservoir 20. Therefore, even when the height of the reservoir 20 is set small in the vertical direction, a large inner volume can be secured in the reservoir 20 as much as possible without causing spill of fuel. In addition, the space 58 is formed as a remaining area on the lid member 30 around the projection 57 of the pump unit 50, which projects from the reservoir 20. The remaining quantity detector 60 is located in the space 58. The present arrangement can secure the inner volume of the reservoir 20. With the present configuration, the fuel storage capacity of the reservoir 20 can be increased within the fuel tank 2 having a limited volume.

Further, the support shaft 41, which connects the pump unit 50 with the flange 10 mounted on the fuel tank 2, is also located in the remaining space 58 formed around the projection 57 in the fuel feed apparatus 1. Therefore, the volume of the reservoir 20 with the support shaft 41 can be secured In the fuel feed apparatus 1, one remaining space 58a and the other remaining space 58b are located across the projection 57 of the pump unit 50. The one remaining space 58a and the other remaining space 58b are effectively used for respectively accommodating the remaining quantity detector 60 and the support shaft 41. Therefore, the volume in the reservoir 20 can be further effectively secured. In addition, the support shaft 41 located in the remaining space 58 is an independent component and may be spaced from other components. Therefore, the support shaft 41 may not interfere with the remaining quantity detector 60 in the remaining space 58 and may not cause reduction in volume of the reservoir 20. Consequently, the remaining quantity detector 60 may not extend beyond the remaining space 58 due to the support shaft 41 interfering with the remaining quantity detector 60 extending beyond the remaining space 58b. Thus, it is not necessary to, for example, dent the lateral side of the reservoir 20 to secure an additional accommodation space for the remaining quantity detector 60 extending beyond the remaining space 58. Thus, the volume of the reservoir 20 can be effectively secured. In the present structure, the fuel storage capacity in the reservoir 20 can be secured as much as possible.

In addition, the slit 37 for supporting the remaining quantity detector 60 on the lid member 30 is formed in the projected portion 36 projected from the reservoir 20 in the fuel feed apparatus 1. Therefore, reduction in volume of the reservoir 20 due to provision of such a holding device can be avoided. Therefore, the present structure of the slit 37 can also contribute to increase in fuel storage capacity of the reservoir 20.

In addition, the fuel feed apparatus 1 includes the jet pump 21 and the remaining quantity detector 60 located correspondingly in the rear portion of the fuel tank 2. The jet pump 21 and the remaining quantity detector 60 provided on the reservoir 20 are arranged below and above in the vertical direction. Therefore, each of the jet pump 21 and the remaining quantity detector 60 can be steadily functionable. Further, the remaining quantity detector 60 located above the jet pump 21 is provided on the lid member 30, which is mounted on the circumferential periphery 24*a* defining the opening 24 of the reservoir 20. Therefore, both reduction in interior volume of the reservoir 20 and complication in shape of the reservoir 20 can be avoided. Therefore, the present configuration can contribute to both increase in fuel storage capacity of the reservoir 20 and enhancement in productivity of the reservoir 20.

Second Embodiment

Figure 8:
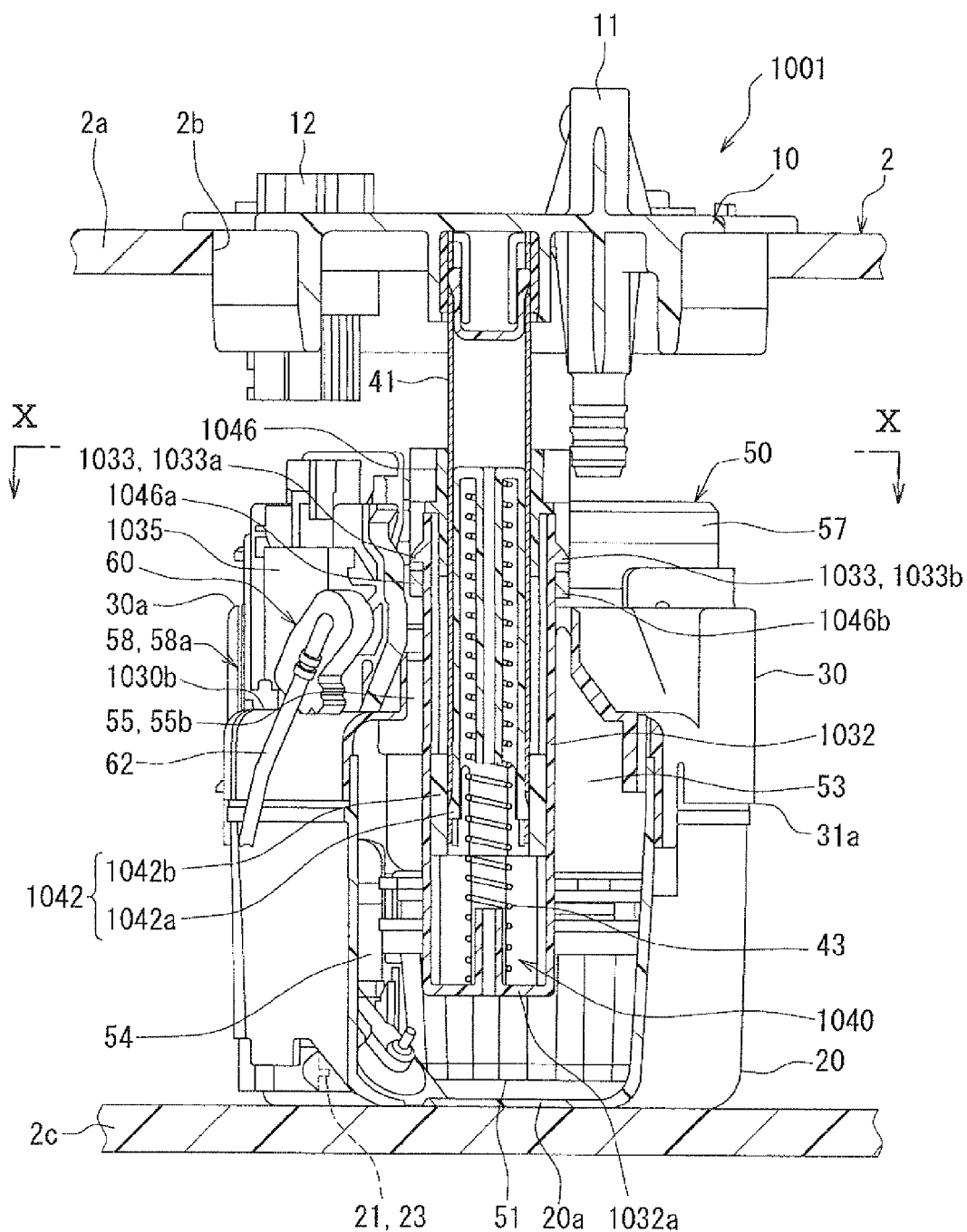
FIG. 8 is a sectional view showing the fuel feed apparatus according to the second embodiment.
Figure 9:
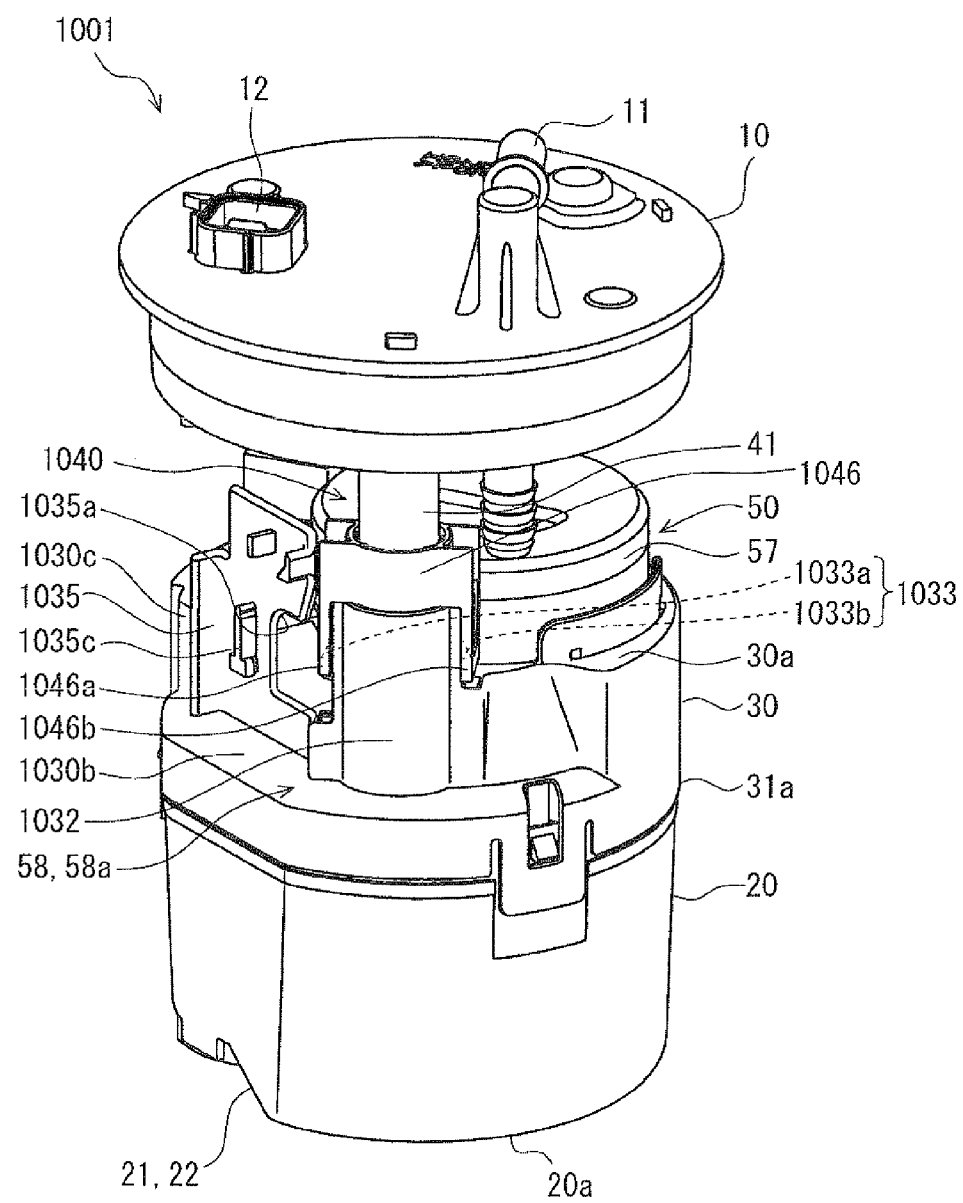
FIG. 9 is a perspective view showing the fuel feed apparatus according to the second embodiment.
Figure 10:
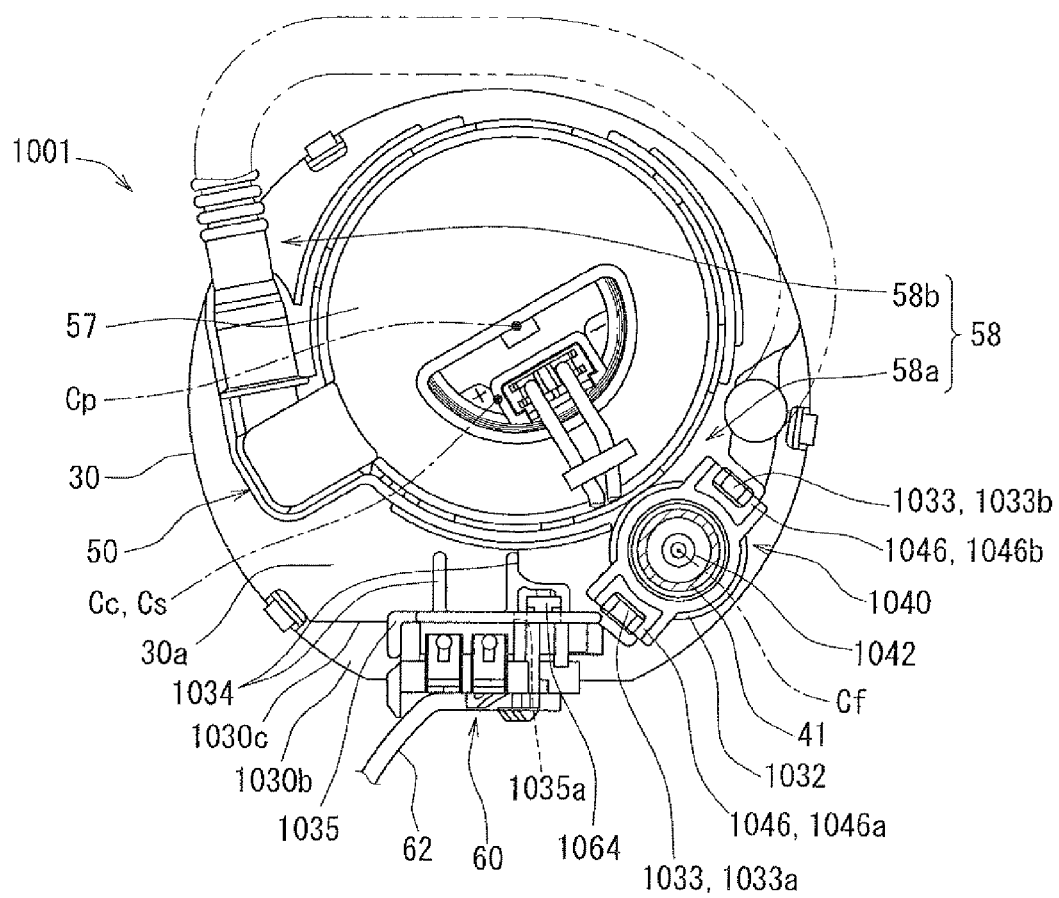
FIG. 10 is a sectional view taken along the line X-X in FIG. 8.

The second embodiment is a modification of the first embodiment. As shown in FIGS. 8 to 10, a fuel feed apparatus 1001 according to the second embodiment includes an adjustment device 1040. The adjustment device 1040 includes an intermediate member 1042 and a holding portion 1046, which have structures different from those of the first embodiment. The holding portion 1046 supports the support shaft 41.

As shown in FIG. 8, the intermediate member 1042 has a coaxial tubular structure including an inner tubular portion 1042*a* formed of resin. The inner tubular portion 1042*a* is fixed to the support shaft 41 and coaxial with each other such that the inner tubular portion 1042*a* is not relatively rotatable in the circumferential direction and is not relatively movable in the axial direction. The intermediate member 1042 further includes an outer tubular portion 1042*b*. The lid member 30 includes an accommodating portion 1032 being in a bottomed tubular shape. The accommodating portion 1032 accommodates the support shaft 41 to be in coaxial with each other. The outer tubular portion 1042*b* is fitted to the accommodating portion 1032 such that the outer tubular portion 1042*b* is not relatively rotatable in the circumferential direction and is relatively slidable in the axial direction. The elastic member 43 is interposed between a bottom portion 1032*a* of the accommodating portion 1032 and the inner tubular portion 1042*a* of the intermediate member 1042. Also in the present example, change in relative position between the integrated components 20, 30, 50, 60 and the support shaft 41 is allowed in the axial direction, while change in relative position between the integrated components 20, 30, 50, 60 and the support shaft 41 is prohibited in the circumferential direction. In the present state, the integrated components 20, 30, 50, 60 are pressed onto the bottom portion 2*c* of the fuel tank 2.

Figure 11:
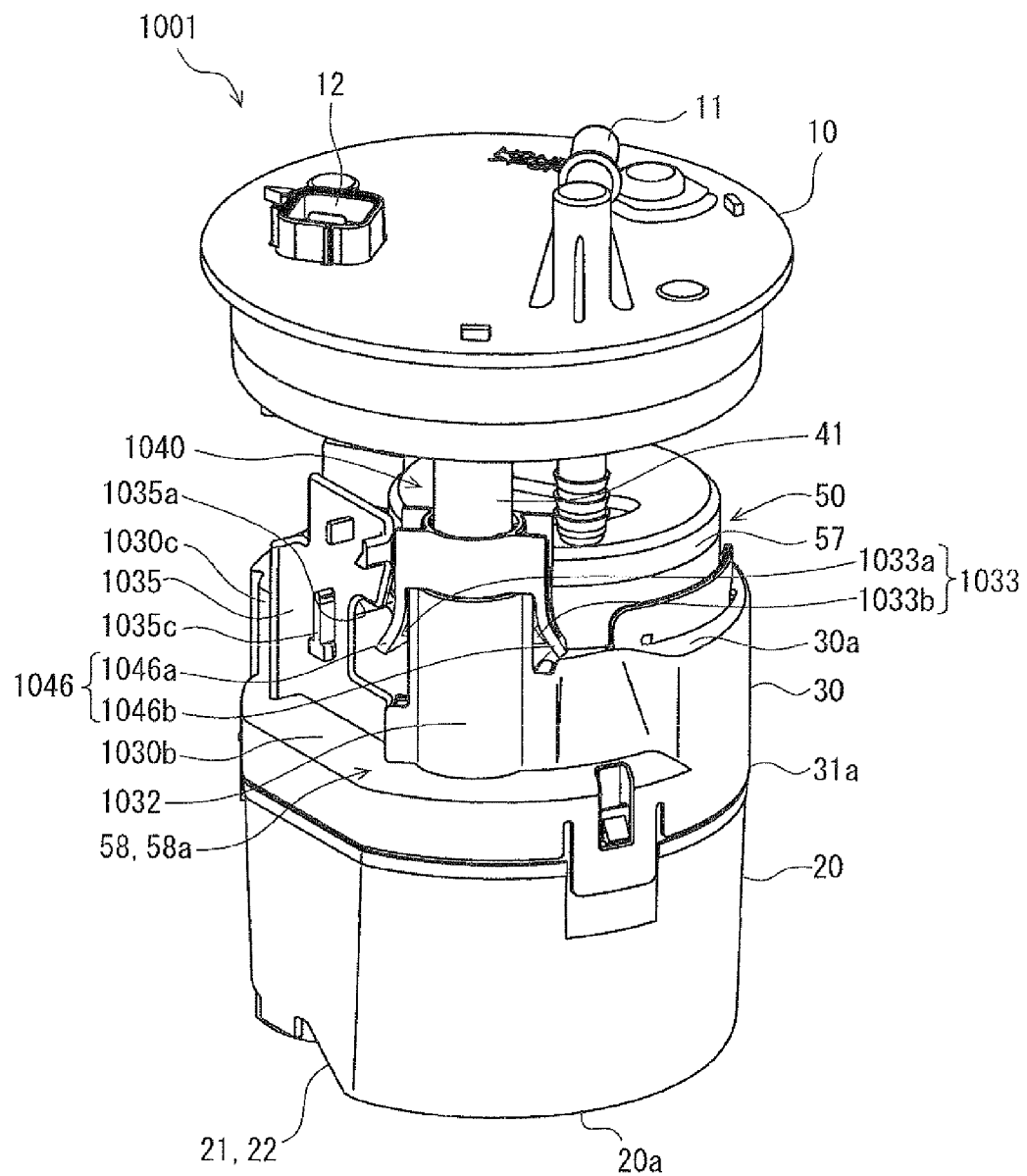
FIG. 11 is a perspective view showing a substantial part of the fuel feed apparatus according to the second embodiment.

As shown in FIGS. 8 to 10, the holding portion 1046 being in an annular shape is formed of resin. The support shaft 41 is inserted into the holding portion 1046 to be coaxial with each other. The holding portion 1046 includes two fitting pieces 1046*a*, 1046*b* located at two positions in the circumferential direction. A fitted portion 1033 includes fitting nails 1033*a*, 1033*b* provided to the outer circumferential periphery of the accommodating portion 1032 of the lid member 30. The fitting pieces 1046*a*, 1046*b* of the holding portion 1046 are respectively fitted to the fitting nails 1033*a*, 1033*b* of the fitted portion 1033. In the present example, as shown in FIG. 11, each of the fitting pieces 1046*a*, 1046*b* is once elastically deformed outward in the radial direction and is restored inward in the radial direction to be snap-fitted with the corresponding one of the fitting nails 1033*a*, 1033*b*. Thereby, the holding portion 1046 is engaged with the lid member 30. In the present configuration, the support shaft 41 is supported by the holding portion 1046 fixed to the lid member 30 in the state where movement of the support shaft 41 relative to the integrated components 20, 30, 50, 60 is allowed in the axial direction.

Referring to FIGS. 8 to 10, the remaining spaces 58*a*, 58*b* are formed to interpose the projection 57 therebetween above the lid member 30, which is in a bottomed tubular shape formed of resin. The remaining spaces 58*a*, 58*b* include the one remaining space 58*a*, which is greater than the other remaining space 58*b* due to the offset of the center axis Cp. Both the remaining quantity detector 60 and the support shaft 41 are located in the one remaining space 58*a*. In the present example, the remaining quantity detector 60 is mounted to a mount portion 1035. The mount portion 1035 is projected from a recessed surface 1030*b*, which is dented relative to the upper surface 30*a* of the lid member 30.

Figure 12:
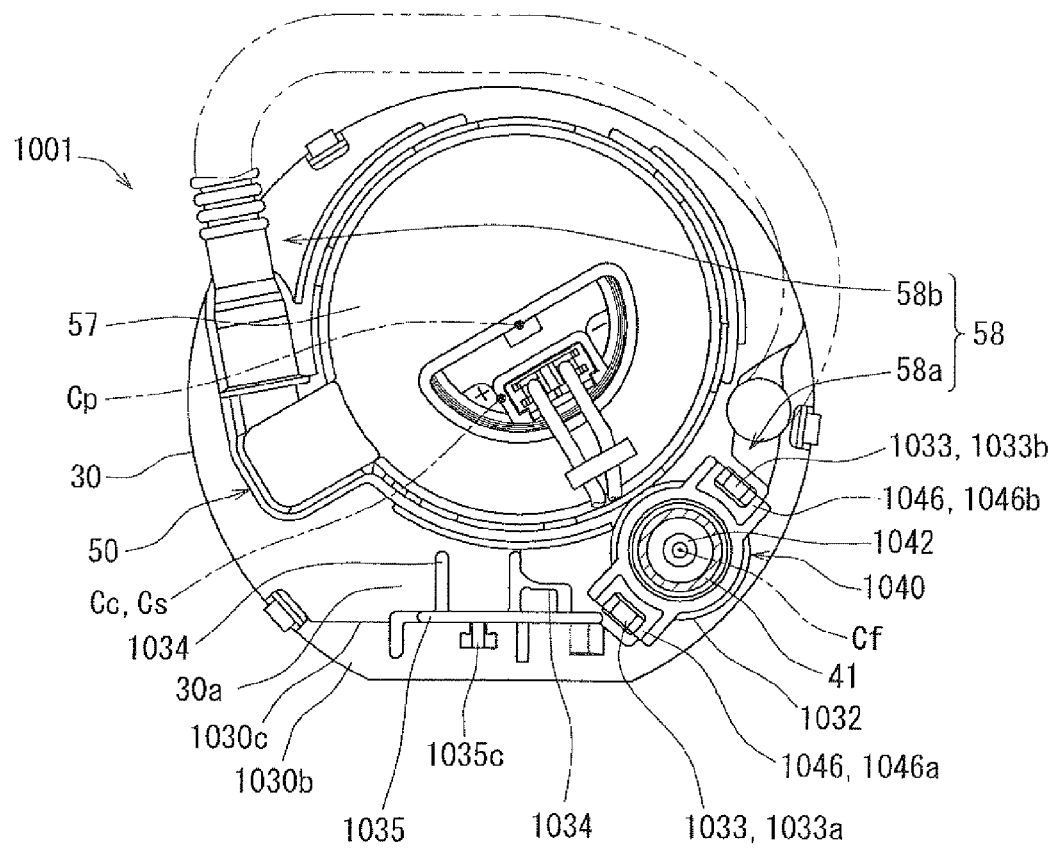
FIG. 12 is a sectional view showing a substantial part of the fuel feed apparatus according to the second embodiment, the drawing corresponding to FIG. 10.
Figure 13:
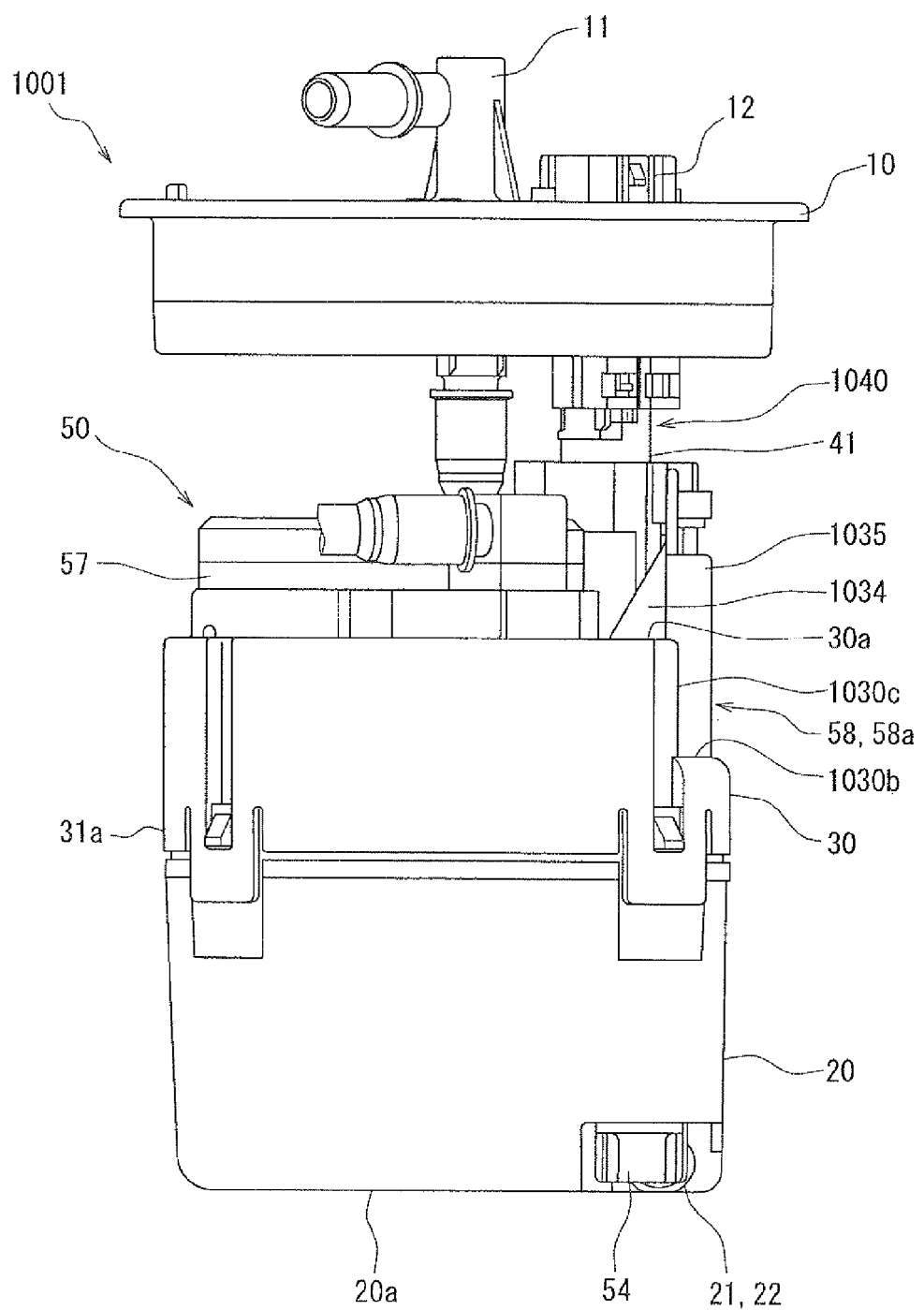
FIG. 13 is a side view showing the fuel feed apparatus according to the second embodiment.

More specifically, as shown in FIGS. 9, 12, 13, the mount portion 1035 being in a plate shape is projected upward substantially in the vertical direction relative to the recessed surface 1030*b*. The mount portion 1035 is supported by a lateral side 1030*c* of the lid member 30. The lateral side 1030*c* connects the upper surface 30*a* with the recessed surface 1030*b*. The mount portion 1035 of the lid member 30 further extends upward beyond the upper surface 30*a*. Thereby, as shown in FIGS. 10, 12, 13, the mount portion 1035 is further supported by multiple rib portions 1034, which is projected upward from the upper surface 30*a*. As shown in FIGS. 9, 12, the mount portion 1035 includes a latch projection 1035*c* projected from a lateral side 1035*b*. The latch projection 1035*c* is latched onto a locking hole ((not shown)) of the remaining quantity detector 60 to support the remaining quantity detector 60.

Further, as shown in FIGS. 9, 10, the mount portion 1035 has a release window 1035*a* extending therethrough in the thickness direction. The release window 1035*a* is a rectangle notch. As shown in FIG. 10, the remaining quantity detector 60 has a bearing portion 1064 being in a tubular shape projected toward the mount portion 1035 for rotatably supporting the support arm 62. The bearing portion 1064 is partially located in the release window 1035*a*, thereby being allowed to be extending through the release window 1035*a*. In addition, when the snap-fitting is performed in the way shown in FIG. 11, the fitting piece 1046*a*, 1046*b* of the holding portion 1046 are elastically deformed and expanded outward. In the present state, the release window 1035*a* allows the fitting piece 1046*a*, which is elastically deformed toward the mount portion 1035, to expand into the mount portion 1035. Thereby, elastic engagement of the holding portion 1046 with the fitted portion 1033 is allowed.

In the fuel feed apparatus 1001 as described above, the one remaining space 58*a* is located on the opposite side of the other remaining space 58*b* through the projection 57. The one remaining space 58*a* is larger than the other remaining space 58*b* and is effectively utilized for accommodating both the remaining quantity detector 60 and the support shaft 41. Therefore, the fuel storage capacity of the reservoir 20 can be increased as much as possible.

Further, the bearing portion 1064 of the remaining quantity detector 60 of the fuel feed apparatus 1001 is allowed to extend into the release window 1035*a* of the mount portion 1035 of the lid member 30 to which the remaining quantity detector 60 is equipped. Therefore, the remaining quantity detector 60 can be easily accommodated within the remaining space 58*a* commonly accommodating the support shaft 41. In addition, the release window 1035*a* of the mount portion 1035 allows elastic fitting of the holding portion 1046 to be engaged with the fitted portion 1033 of the lid member 30. Therefore, the holding portion 1046 holding the support shaft 41 can be easily mounted to the lid member 30, even in the remaining space 58*a* commonly accommodating the remaining quantity detector 60. As described above, in the present configuration, the remaining quantity detector 60 can be easily accommodated within the remaining space 58*a*. Thus, the fuel storage capacity of the reservoir 20 can be easily increased. Further, in the present configuration, the holding portion 1046 can be easily mounted to the remaining space 58*a*. Therefore, productivity of the fuel feed apparatus 1001 can be enhanced.

In the fuel feed apparatus 1001, inner volume of the reservoir 20 can be secured excluding the portion where the recessed surface 1030*b* is formed and dented downward beyond the upper surface 30*a* of the lid member 30. In addition, the large remaining space 58*a* is secured on the upper portion of the recessed surface 1030*b*. The remaining quantity detector 60 is mounted to the mount portion 1035, which is projected upward from the recessed surface 1030*b*. Thereby, the remaining quantity detector 60 is accommodated in the remaining space 58*a* common with the support shaft 41. Thus, the fuel storage capacity of the reservoir 20 can be increased. In addition, the mount portion 1035 having the release window 1035*a* is supported by the rib portions 1034, which are projected upward from the upper surface 30*a* of the lid member 30 and thereby reinforced. Therefore, both the easy-accommodation of the remaining quantity detector 60 in the remaining space 58*a* and the easy mounting of the holding portion 1046 as described above can be achieved with high rigidity and durability.

Third Embodiment

Figure 14:
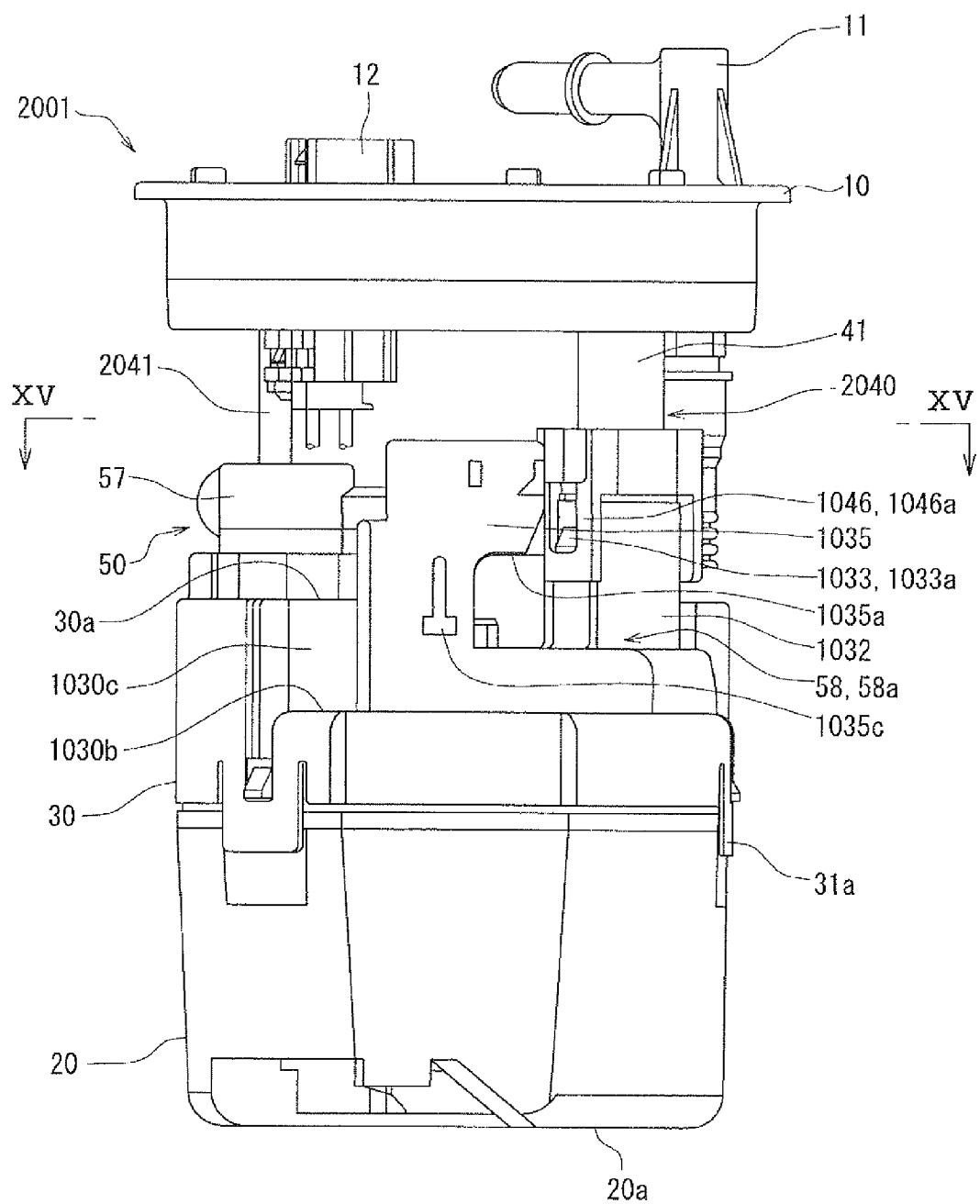
FIG. 14 is a front view showing a fuel feed apparatus according to the third embodiment.
Figure 15:
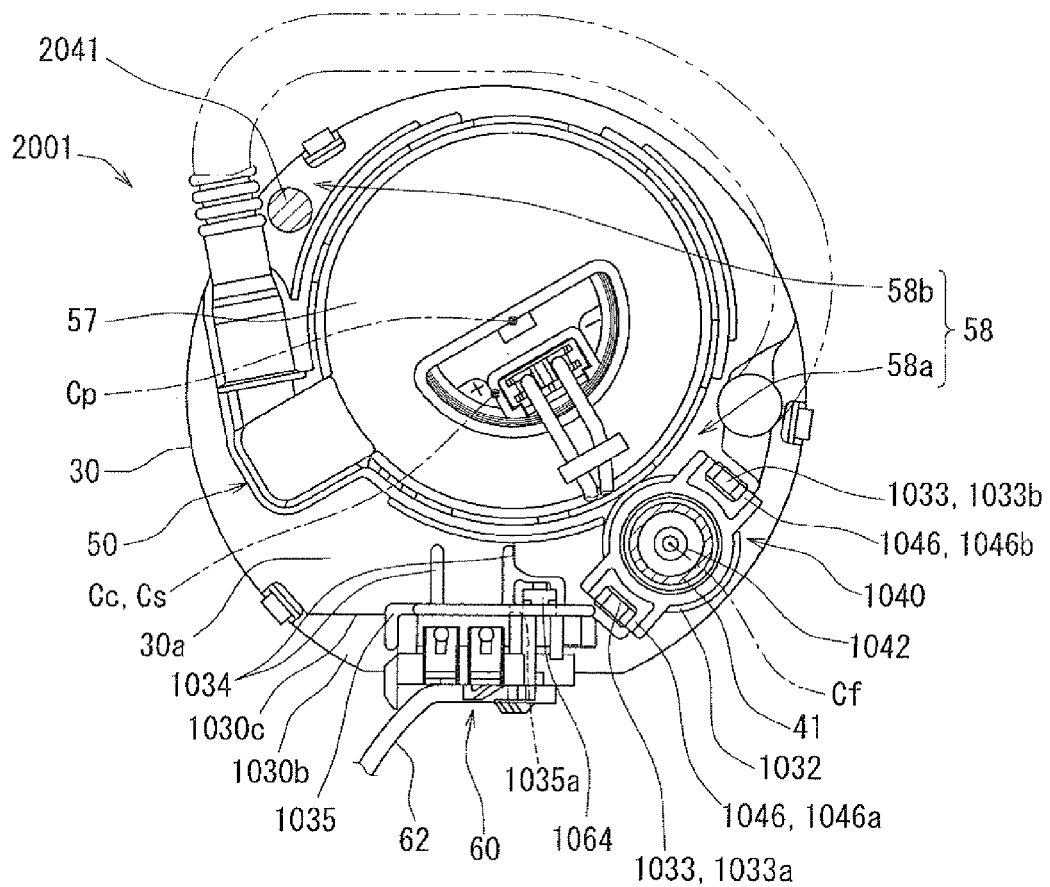
FIG. 15 is a sectional view taken along the line XV-XV in FIG. 14.

The third embodiment is a modification of the second embodiment. As shown in FIGS. 14, 15, a fuel feed apparatus 2001 according to the third embodiment includes an adjustment device 2040. The adjustment device 2040 includes a second support shaft 2041 formed of metal or resin in addition to the first support shaft 41 formed of metal. The remaining spaces 58*a*, 58*b* are located on opposite sides of the projection 57. The second support shaft 2041 is located in the remaining space 58*b* on the opposite side of both the first support shaft 41 and the remaining quantity detector 60. The second support shaft 2041 is coaxially press-fitted to the flange 10. The second support shaft 2041 is further fitted to the lid member 30 and relatively movable in the axial direction.

Also in the present fuel feed apparatus 2001, change in relative position between the integrated components 20, 30, 50, 60 and the first support shaft 41 is allowed in the axial direction, while change in relative position between the integrated components 20, 30, 50, 60 and the first support shaft 41 is prohibited in the circumferential direction. In the present state, the integrated components 20, 30, 50, 60 are pressed onto the bottom portion 2*c* of the fuel tank 2. Therefore, the fuel feed apparatus 2001 is capable of producing the same operation effect as that of the second embodiment. In addition, space reduction effect can be achieved by utilizing the remaining space 58*b* other than the remaining space 58*a*, in which the first support shaft 41 and the remaining quantity detector 60 are located.

Fourth Embodiment

Figure 16:
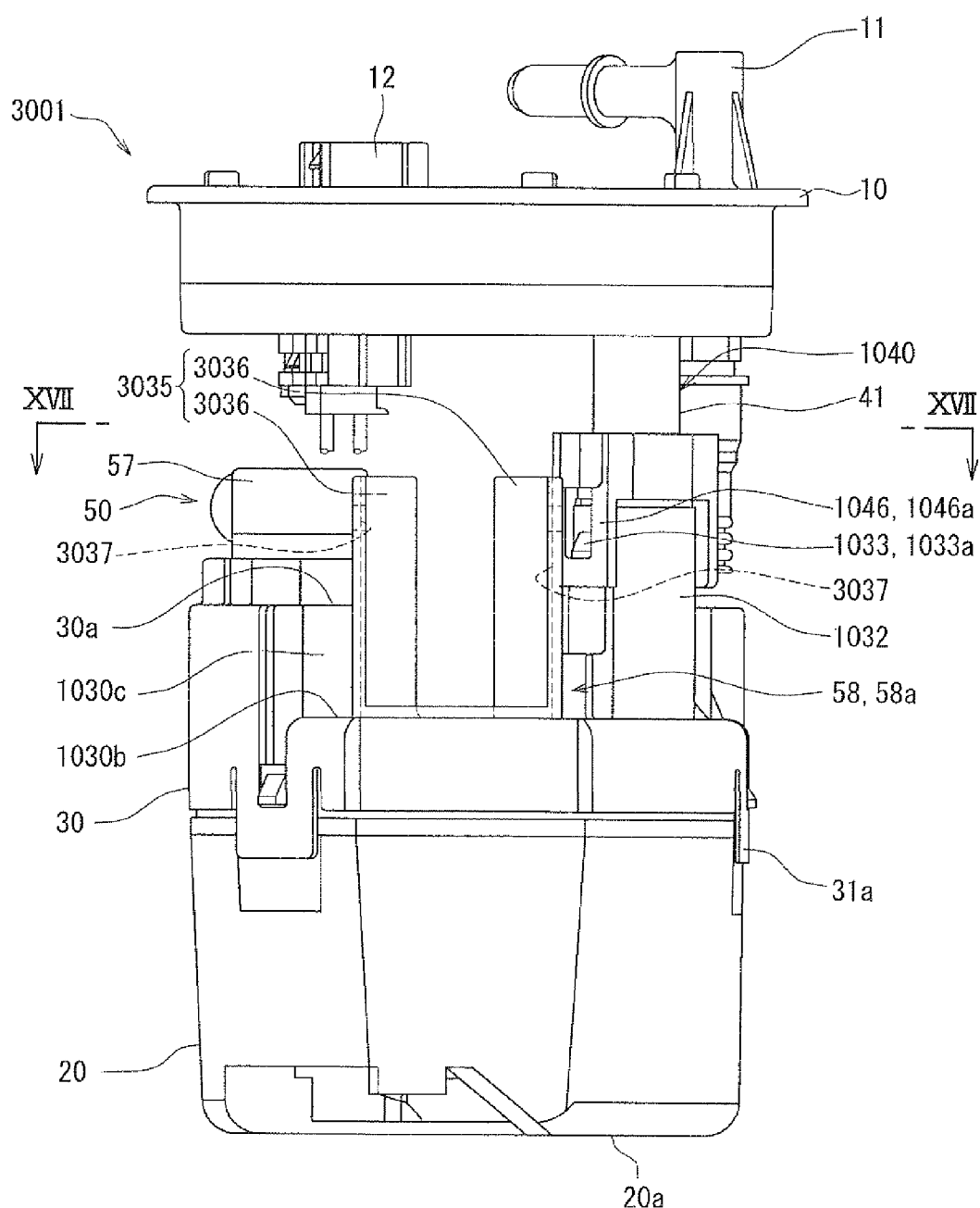
FIG. 16 is a front view showing a substantial part of the fuel feed apparatus according to the fourth embodiment.
Figure 17:
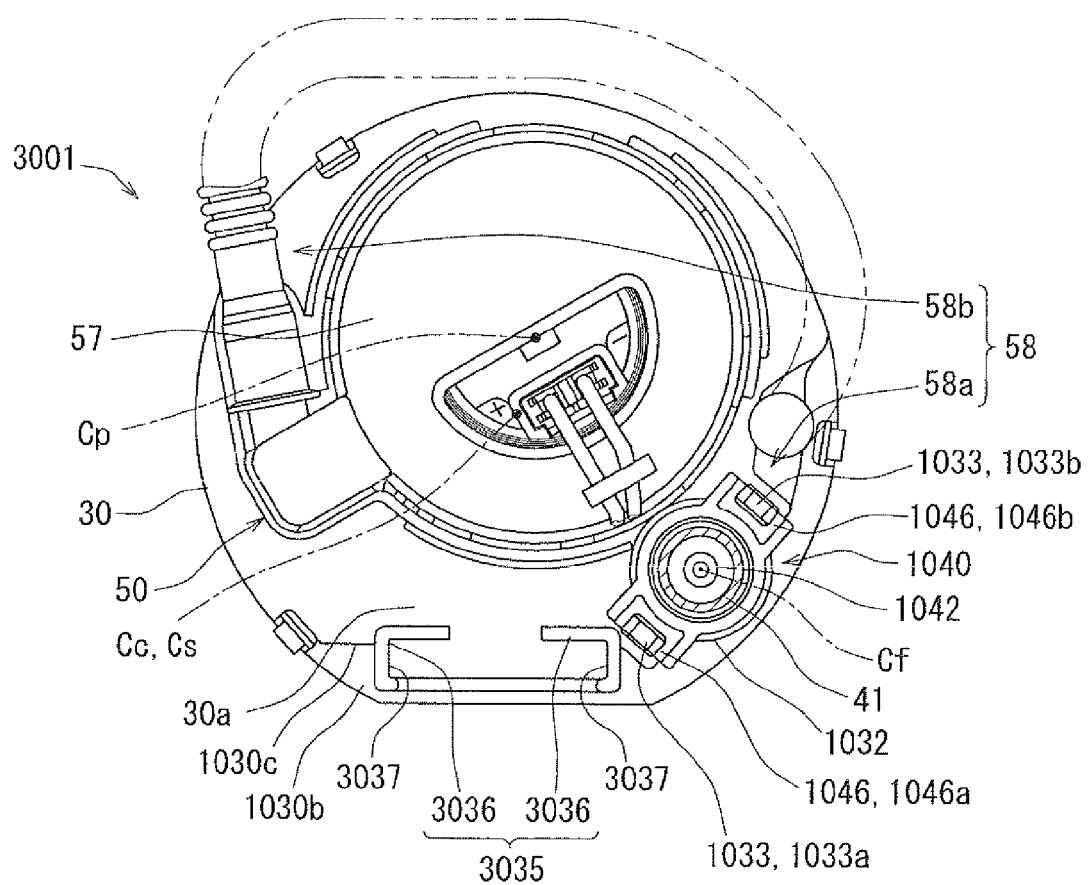
FIG. 17 is a sectional view taken along the line XVII-XVII in FIG. 16.
Figure 18:
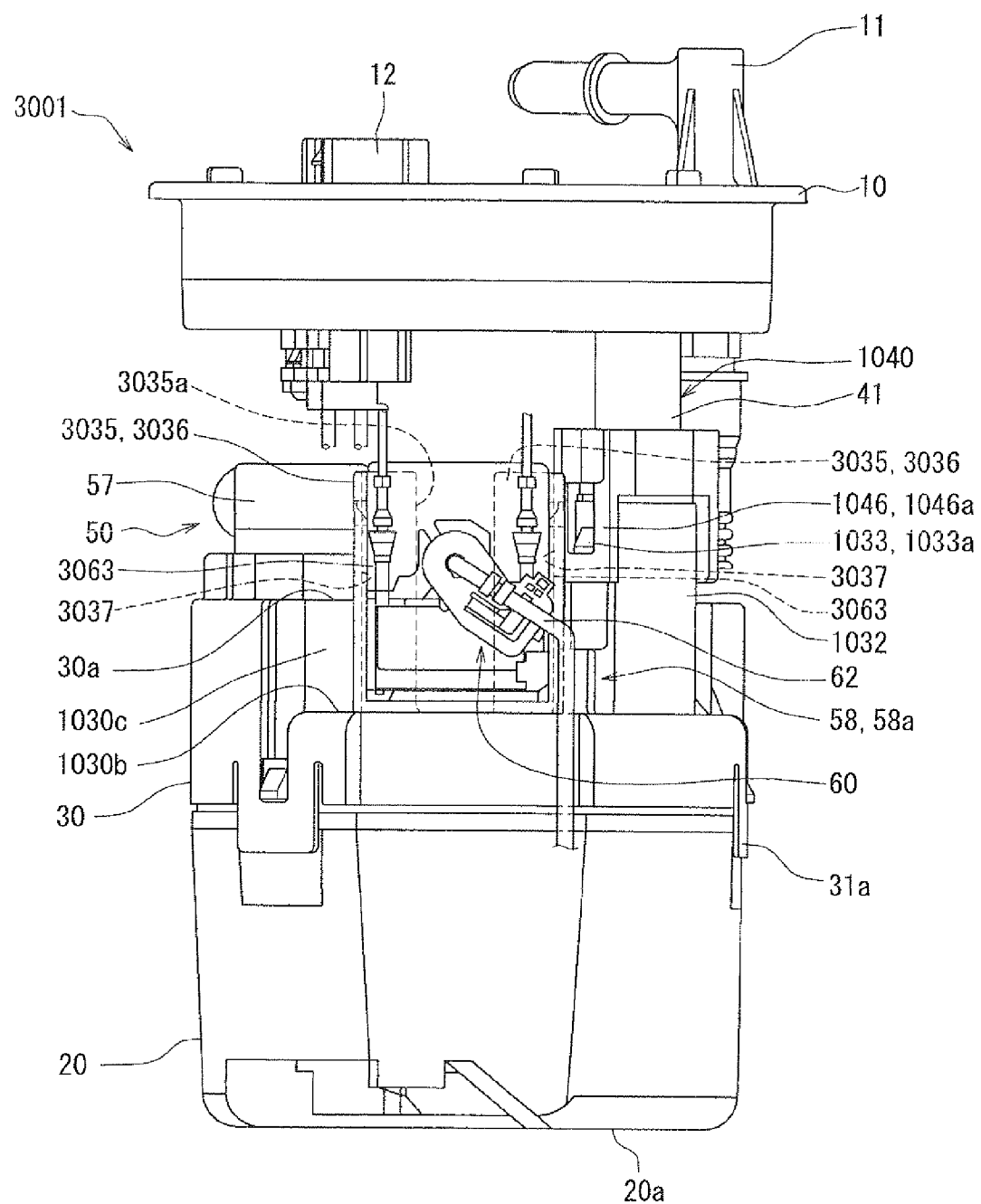
FIG. 18 is a front view showing a fuel feed apparatus according to the fourth embodiment.
Figure 19:
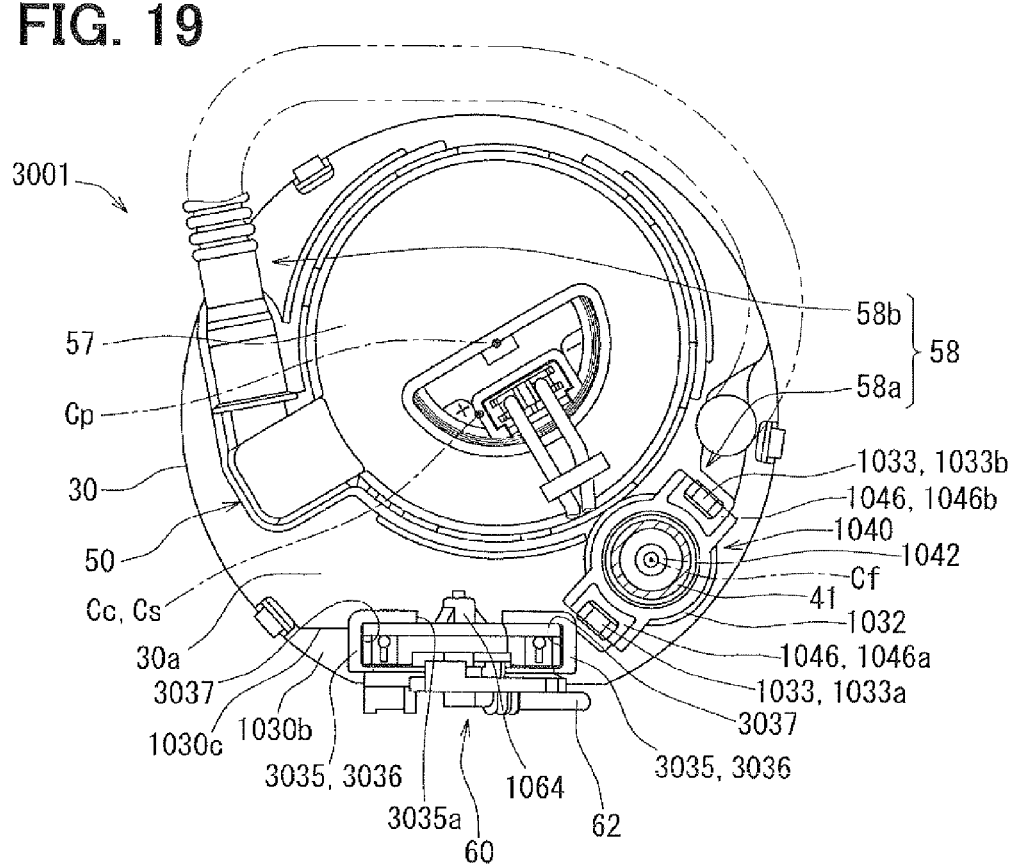
FIG. 19 is a sectional view taken along the line XIX-XIX in FIG. 18.

The fourth embodiment is a modification of the second embodiment. As shown in FIGS. 16, 17, a fuel feed apparatus 3001 of the fourth embodiment includes the lid member 30 formed of resin. The lid member 30 includes a mount portion 3035 having a pair of projected portions 3036. Specifically, the projected portions 3036 of the mount portion 3035 are projected from two locations on the recessed surface 1030*b* of the lid member 30 toward the outside of the reservoir 20. The two locations are spaced from each other in the circumferential direction. Each of the projected portions 3036 has a cross section in a U-shape or an L-shape. In the present structure, each of the projected portions 3036 defines a slit 3037 while being supported by the lateral side 1030*c* of the lid member 30. The slit 3037 is extended substantially perpendicularly to the recessed surface 1030*b* of the lid member 30. Referring to FIGS. 18, 19, the remaining quantity detector 60 includes a pair of fitting portions 3063 each being in a plate shape. Each of the fitting portions 3063 is slid into the slit 3037 of each of the projected portions 3036 and fitted to the lid member 30. Thus, the remaining quantity detector 60 is mounted to the lid member 30. The remaining quantity detector 60 of the present example is supported by the lid member 30 in the above-described way. The mount portion 3035 of the remaining quantity detector 60 includes projected portions 3036 defining a release window 3035*a* therebetween. As shown in FIG. 19, the bearing portion 1064 extending from the remaining quantity detector 60 is released through the release window 3035*a*. That is, the bearing portion 1064 is allowed to extend through the release window 3035*a*.

As described above, the slit 3037 for supporting the remaining quantity detector 60 on the lid member 30 is formed in the projected portion 3036 projected from the reservoir 20 in the fuel feed apparatus 3001. Therefore, reduction in volume of the reservoir 20 due to provision of such a holding device can be avoided. Therefore, the present structure of the slit 37 can contribute to increase in fuel storage capacity of the reservoir 20.

Further, in the fuel feed apparatus 3001, the larger remaining space 58*a* including the upper space of the recessed surface 1030*b* is effectively utilized for accommodating both the remaining quantity detector 60 and the support shaft 41. Further, the bearing portion 1064 projected from the remaining quantity detector 60 of the fuel feed apparatus 3001 is allowed to extend into the release window 3035*a* of the mount portion 3035 of the lid member 30 to which the remaining quantity detector 60 is equipped. Therefore, the remaining quantity detector 60 can be easily accommodated within the remaining space 58*a* commonly accommodating the support shaft 41. In this way, reduction in volume of the reservoir 20 can be also avoided. Therefore, the present configuration contributes increase in fuel storage capacity of the reservoir 20.

Other Embodiment

As described above, the present invention is not limited to the above embodiment, and is capable of being applied to various embodiments and combinations as long as being undeviating from the gist thereof.

Figure 20:
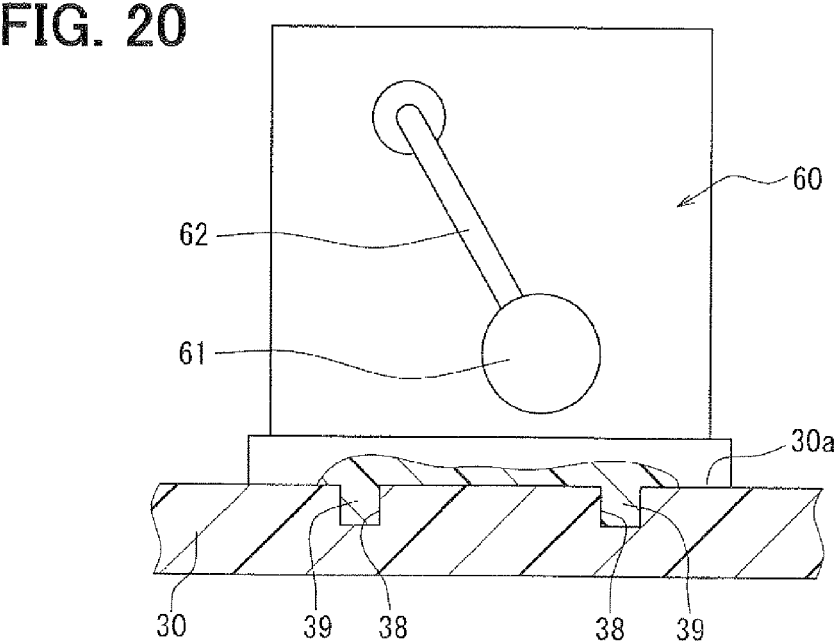
FIG. 20 is a schematic view showing a modification of the fuel feed apparatus according to the first embodiment.

Specifically, the remaining quantity detector 60 is not limited to have the configuration to detect remaining fuel according to the rotation angle of the arm 62 supporting the float 61, as described above. The remaining quantity detector 60 may have various configurations for detecting the remaining fuel, as long as being supported by the lid member 30. The number of the support shaft 41 is not limited to one. For example, similarly to the third embodiment, the flange 10 may be connected with the integrated components 20, 30, 50, 60 via two or more pillars. In this case, particular one pillar or two or more pillars may be employed as the support shaft 41 in the above examples. The support structure of the remaining quantity detector 60 by the lid member 30 is not limited to those in the above-described first to fourth embodiments in which the remaining quantity detector 60 is mounted to the mount portion 35, 1035, 3035. Various kinds of support structures for the remaining quantity detector 60 may be employable. For example, as shown in FIG. 20, the upper surface 30a of the lid member 30 may have holes 38 as mount portions. In this case, the remaining quantity detector 60 may have press-fitted portions 39 projected downward and press-fitted to the hole 38. Thus, the remaining quantity detector 60 may be supported by the lid member 30 in this way. Alternatively, the mount portion 3035 of the fourth embodiment may be provided in place of the mount portion 35, 1035 of the first and third embodiments. In this case, the mount portion 3035 may be projected from the upper surface 30a of the lid member 30 to support the remaining quantity detector 60 on the lid member 30.

Summarizing the above-described embodiments, the fuel feed apparatus includes:

the reservoir being in the bottomed tubular shape and located in the fuel tank;

the lid member located in the fuel tank and mounted to the periphery of the opening of the reservoir to close the opening;

the pump unit partially accommodated in the reservoir and located at a position offset from the center axis of the lid member, the pump unit including a projection projected from the lid member to the exterior of the reservoir, the pump unit being configured to discharge fuel stored in the reservoir to the exterior of the fuel tank; and the remaining quantity detector located at the remaining space remaining around the projection on the lid member in the fuel tank and configured to detect remaining fuel in the fuel tank.

In the present structure, the lid member located in the fuel tank is mounted to the periphery of the opening of the reservoir to block the opening. Therefore, even when the vehicle inclines rapidly relative to the horizontal surface, the lid member may avoid leakage of fuel from the opening. In addition, the pump unit partially accommodated in the reservoir is projected from the lid member to the outside of the reservoir. Therefore, even when the height of the reservoir is set small, the reservoir can secure the inner volume as much as possible without causing spill of fuel. In addition, the pump unit is at least partially accommodated in the reservoir and located at the position offset from the center axis of the lid member. With the present structure, the space in the fuel tank remains on the lid member around the projection of the pump unit projected out of the reservoir. Therefore, the remaining quantity detector can be adequately arranged by effectively utilizing the remaining space around the projection, without decreasing the volume in the reservoir. With the present configuration, the fuel storage capacity of the reservoir can be increased within the fuel tank having a predetermined limited volume.

The fuel feed apparatus may further include: a pillar located at the remaining space; and a flange mounted to the fuel tank and connected with the pump unit via the pillar being independent. In the present structure, the pillar, which connects the pump unit with the flange mounted to the fuel tank, is arranged at the remaining space around the projection. Therefore, reduction in volume of the reservoir due to the arrangement of the pillar can be avoided. In addition, the pillar located at the remaining space is an independent component. For example, the pillar is a different component from the remaining quantity detector and is spaced from the remaining quantity detector. Therefore, reduction in volume of the reservoir due to interference of the pillar with the remaining quantity detector in the remaining space can also be avoided. Therefore, the present structure can contribute to increase in fuel storage capacity of the reservoir.

The remaining space may include one remaining space (first remaining space portion) and another remaining space (second remaining space portion) located on both sides of the projection. In this case, the remaining quantity detector may be located at the one remaining space, and the pillar may be located at the other remaining space. In the present structure, the one remaining space and the other remaining space on both sides of the projection can be used effectively for arrangement of the remaining quantity detector and for arrangement of the pillar respectively. Therefore, the fuel storage capacity of the reservoir can be increased at a maximum extent.

The remaining space may include one remaining space and another remaining space located on both sides of the projection. In this case, both the remaining quantity detector and the pillar may be located at the one remaining space. In the present structure, for example, the one remaining space may be larger than the other remaining space across the projection. In this case, the larger one remaining space can be used effectively for arrangement of both the remaining quantity detector and the support shaft. Therefore, the fuel storage capacity of the reservoir can be increased at a maximum extent.

The remaining quantity detector may include: the float floating in fuel in the fuel tank; the arm holding the float; and the bearing portion supporting the arm. In this case, the remaining quantity detector may be configured to detect a quantity of fuel remaining in the fuel tank according to the rotation angle of the arm. In this case, the lid member may include: the mount portion equipped with the remaining quantity detector; and the fitted portion to which the holding portion, which holds the pillar, is elastically engaged. In this case, the mount portion may have the release window configured to: release the bearing portion being projected; and allow the elastic engagement of the holding portion. In this case, the remaining quantity detector includes the bearing portion being projected for supporting the arm holding the float. The bearing portion being projected is released into the release window of the mount portion of the lid member to which the remaining quantity detector is mounted. Therefore, the remaining quantity detector can be easily accommodated within the remaining space commonly used for the support shaft. In addition, the release window of the mount portion, to which the remaining quantity detector is mounted, allows elastic engagement of the holding portion to be engaged with the fitted portion of the lid member. Therefore, the holding portion holding the pillar can be easily mounted to the lid member, even in the remaining space commonly accommodating the remaining quantity detector. As described above, in the present configuration, the remaining quantity detector can be easily accommodated within the remaining space. Thus, the fuel storage capacity of the reservoir can be easily increased. Further, in the present configuration, the holding portion can be easily mounted to the remaining space. Therefore, productivity of the fuel feed apparatus can be enhanced.

The lid member may include: the mount portion, which is projected upward from the recessed surface being dented downward relative to the upper surface, and to which the remaining quantity detector is mounted; and the rib portion projected upward from the upper surface to support the mount portion. In the present structure, the inner volume of the reservoir can be secured under the portion of the lid member other than the portion of the lid member under which the recessed surface is formed and dented downward from the upper surface. In addition, the large remaining space can be secured under the portion of the lid member on the upper side of the recessed surface. In this case, the remaining quantity detector is mounted to the mount portion, which is projected upward from the recessed surface. Thereby, the detector is accommodated in the remaining space common with the support shaft. Thus, the fuel storage capacity of the reservoir can be increased at a maximum extent. In addition, the mount portion having the release window is supported by the rib portion, which is projected upward from the upper surface of the lid member and thereby reinforced. Therefore, both the easy-accommodation of the remaining quantity detector in the remaining space and the easy mounting of the holding portion as described above can be achieved together with high rigidity and durability.

The lid member may include the projected portion projected to the outside of the reservoir to form the slit. In this case, the remaining quantity detector may be fitted to the slit and supported by the lid member. In the present structure, the lid member has the slit for supporting the remaining quantity detector formed in the projected portion projected to the outside of the reservoir. Therefore, reduction in volume of the reservoir due to provision of such a holding device can be avoided. Therefore, the present structure can contribute to increase in fuel storage capacity of the reservoir.

The fuel feed apparatus may further comprise the jet pump located on the lower side of the remaining quantity detector in the reservoir and configured to transport fuel in the fuel tank into the reservoir by injecting fuel. In the present structure, the jet pump, which transports fuel in the fuel tank into the reservoir by the fuel injection, and the remaining quantity detector, which detects fuel remaining in the fuel tank, may be arranged together at a place where fuel can be secured in the fuel tank irrespective of inclination of the vehicle relative to the horizontal plane. In consideration of this, the jet pump and the remaining quantity detector can be aligned in the vertical direction of the reservoir in the arrangement where the jet pump is located under the remaining quantity detector in the reservoir. With the present configuration, both the functions of the jet pump and the remaining quantity detector can be steadily produced. Further, the remaining quantity detector located above the jet pump is provided on the lid member, which is mounted on the circumferential periphery defining the opening of the reservoir. Therefore, both reduction in volume of the reservoir and complication in shape of the reservoir can be avoided. Therefore, the present configuration can contribute to both increase in fuel storage capacity of the reservoir and enhancement in productivity of the reservoir.

When only a part of a structure of an element is described in an embodiment, other part of the structure of the element in another foregoing embodiment may be applied to the embodiment. The combinations of the components are not limited to those in the above-described embodiments. The components in different embodiments may be partially or entirely combined, as long as the components can be properly combined, even if such a combination is not explicitly described.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A fuel feed apparatus for feeding fuel from a fuel tank, the fuel feed apparatus comprising:
    a reservoir located in the fuel tank, the reservoir being in a bottomed tubular shape having a periphery defining an opening;
    a lid member located in the fuel tank and mounted to the periphery of the reservoir to close the opening;
    a pump unit partially accommodated in the reservoir and configured to discharge fuel stored in the reservoir to an exterior of the fuel tank, the pump unit being located at a position offset from a center axis of the lid member, the pump unit having a projection projected from the lid member to an exterior of the reservoir;
    a remaining quantity detector configured to detect a quantity of fuel in the fuel tank, the remaining quantity detector being located at a remaining space remaining in the fuel tank, the remaining space being located on the lid member and located around the projection;
    a pillar located at the remaining space; and
    a flange mounted to the fuel tank and connected with the pump unit via a support shaft, the support shaft being an independent component; wherein
    the remaining space includes a first remaining space portion and a second remaining space portion located on both sides of the projection, and
    both the remaining quantity detector and the support shaft are located at the first remaining space portion;
    the remaining quantity detector includes:
        a float floating in fuel in the fuel tank;
        an arm holding the float; and
        a bearing portion supporting the arm,
    the remaining quantity detector is configured to detect the quantity of fuel in the fuel tank according to a rotation angle of the arm,
    the lid member includes:
        a mount portion to which the remaining quantity detector is mounted;
        a holding portion holding the support shaft; and
        a fitted portion to which the holding portion is elastically fitted, and the mount portion has a release window configured to:
        release the bearing portion being projected; and
        allow elastic fitting of the holding portion.

2. The fuel feed apparatus according to claim 1, wherein the lid member has:
    an upper surface; and
    a recessed surface being recessed downward relative to the upper surface,
    the mount portion is projected upward from the recessed surface to receive the remaining quantity detector, and
    the lid member includes a rib portion projected upward from the upper surface to support the mount portion.

3. The fuel feed apparatus according to claim 1, further comprising:
    a jet pump located on a lower side of the remaining quantity detector in the reservoir and configured to inject fuel to transport fuel from the fuel tank into the reservoir.

4. The fuel feed apparatus according to claim 1, wherein the support shaft is a different component from the remaining quantity detector, and
    the support shaft is spaced from the remaining quantity detector.

5. The fuel feed apparatus according to claim 1, wherein the release window is configured to:
   allow the bearing portion to extend into the release window to release the bearing portion being projected; and
   enable the holding portion to expand through the release window when being elastically deformed to allow the elastic fitting of the holding portion.

6. The fuel feed apparatus according to claim 1, wherein the first remaining space portion is larger than the second remaining space portion.

* * * * *